United States Patent
Ma et al.

(10) Patent No.: US 11,563,873 B2
(45) Date of Patent: Jan. 24, 2023

(54) WIDE-ANGLE 3D SENSING

(71) Applicant: QUALCOMM Incorporated, San Diego, CA (US)

(72) Inventors: Jian Ma, San Diego, CA (US); Sergiu Goma, San Diego, CA (US); Biay-Cheng Hseih, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 16/848,487

(22) Filed: Apr. 14, 2020

(65) Prior Publication Data

US 2021/0321021 A1  Oct. 14, 2021

(51) Int. Cl.
| | | |
|---|---|---|
| H04N 5/222 | (2006.01) | |
| G02B 5/18 | (2006.01) | |
| H04N 5/232 | (2006.01) | |
| G01S 7/481 | (2006.01) | |
| G01S 7/484 | (2006.01) | |
| G01S 17/08 | (2006.01) | |

(52) U.S. Cl.
CPC .......... *H04N 5/2226* (2013.01); *G01S 7/481* (2013.01); *G01S 7/484* (2013.01); *G01S 17/08* (2013.01); *G02B 5/1814* (2013.01); *H04N 5/232125* (2018.08); *G06T 2207/10028* (2013.01)

(58) Field of Classification Search
None
See application file for complete search history.

(56) References Cited

U.S. PATENT DOCUMENTS

| | | | | |
|---|---|---|---|---|
| 10,044,985 | B1* | 8/2018 | Parker | H04N 7/18 |
| 2005/0117015 | A1* | 6/2005 | Cutler | H04N 5/232 |
| | | | | 348/E7.079 |
| 2009/0086081 | A1* | 4/2009 | Tan | G06T 7/80 |
| | | | | 348/E5.022 |
| 2011/0284727 | A1 | 11/2011 | Konishi et al. | |
| 2014/0118257 | A1 | 5/2014 | Baldwin | |

(Continued)

FOREIGN PATENT DOCUMENTS

| | | |
|---|---|---|
| WO | WO-2016076796 A1 | 5/2016 |
| WO | WO-2018217367 A1 | 11/2018 |

OTHER PUBLICATIONS

Co-pending U.S. Appl. No. 15/968,317, filed May 1, 2018.
(Continued)

*Primary Examiner* — Edemio Navas, Jr.
(74) *Attorney, Agent, or Firm* — Qualcomm Incorporated

(57) ABSTRACT

Aspects of the present disclosure relate to depth sensing using a device. An example device includes a first light projector configured to project light towards a second light projector configured to project light towards the first light projector. The example device includes a reflective component positioned between the first and second light projectors, the reflective component configured to redirect the light projected by the first light projector onto a first portion of a scene and to redirect the light projected by the second light projector onto a second portion of the scene, and the first and second portions of the scene being adjacent to one another and non-overlapping relative to one another. The example device includes a receiver configured to detect reflections of redirected light projected by the first and second light projectors.

30 Claims, 14 Drawing Sheets

(56) References Cited

U.S. PATENT DOCUMENTS

| | | | |
|---|---|---|---|
| 2017/0131568 A1 | 5/2017 | Haddock | |
| 2017/0329012 A1* | 11/2017 | Büttgen | ................. G01B 11/25 |
| 2018/0035887 A1* | 2/2018 | Nakanishi | .............. G02B 21/22 |
| 2018/0124372 A1 | 5/2018 | Yang et al. | |
| 2018/0341008 A1* | 11/2018 | Ortiz Egea | ........... G01S 7/4816 |
| 2019/0018137 A1* | 1/2019 | Akkaya | .............. G02B 27/4272 |
| 2019/0369247 A1 | 12/2019 | Lindner et al. | |
| 2020/0025924 A1* | 1/2020 | Aotake | ................. G01S 17/894 |
| 2020/0386540 A1 | 12/2020 | Hseih | |

OTHER PUBLICATIONS

International Search Report and Written Opinion—PCT/US2021/026865—ISA/EPO—dated Jun. 23, 2021.
Na N., et al., "Proposal and Demonstration of Germanium-on-Silicon Lock-in Pixels for Indirect Time-of-Flight Based Three-Dimensional Sensing", Arvix.org (Year: 2018), 10 Pages.

* cited by examiner

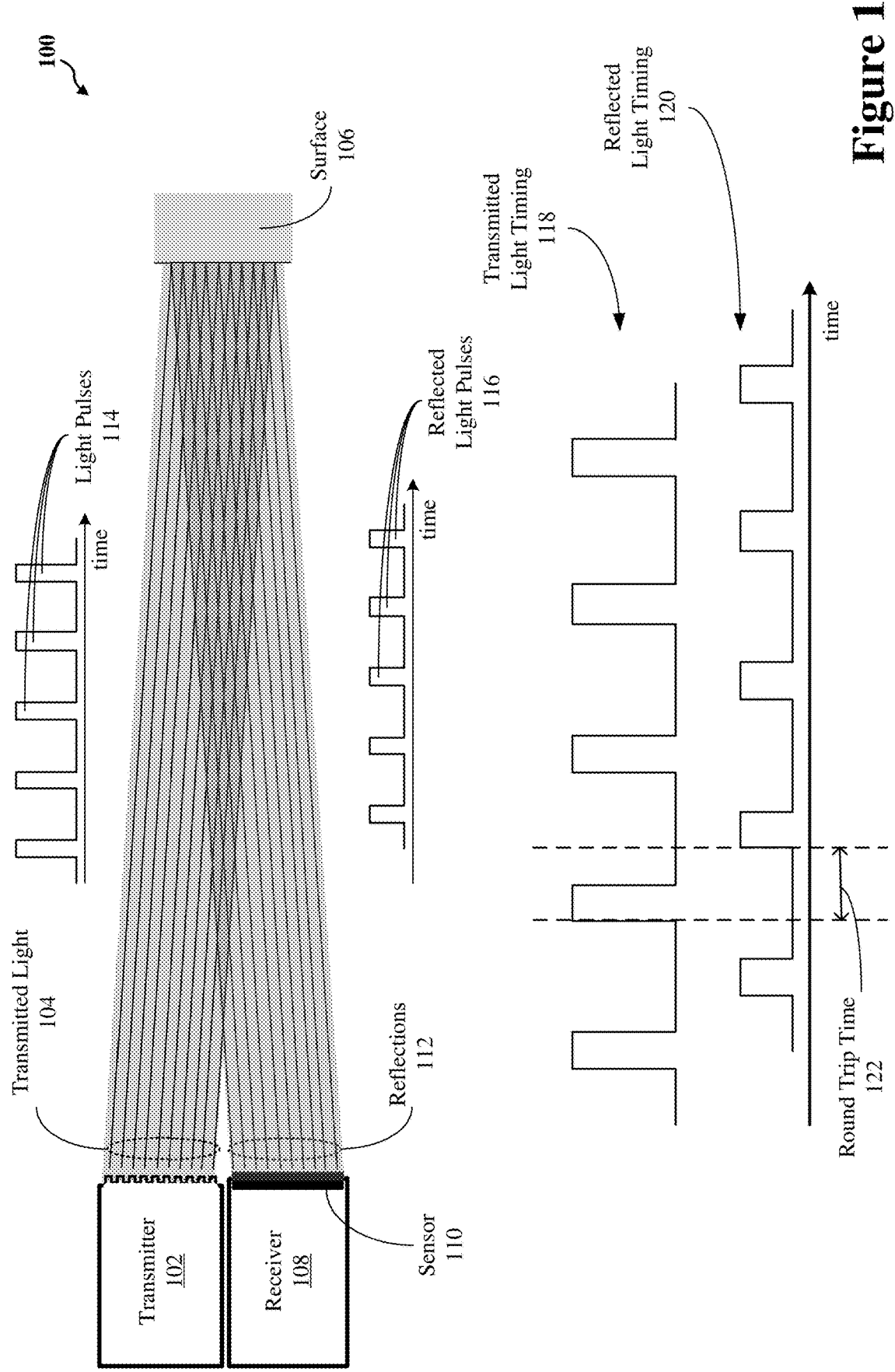

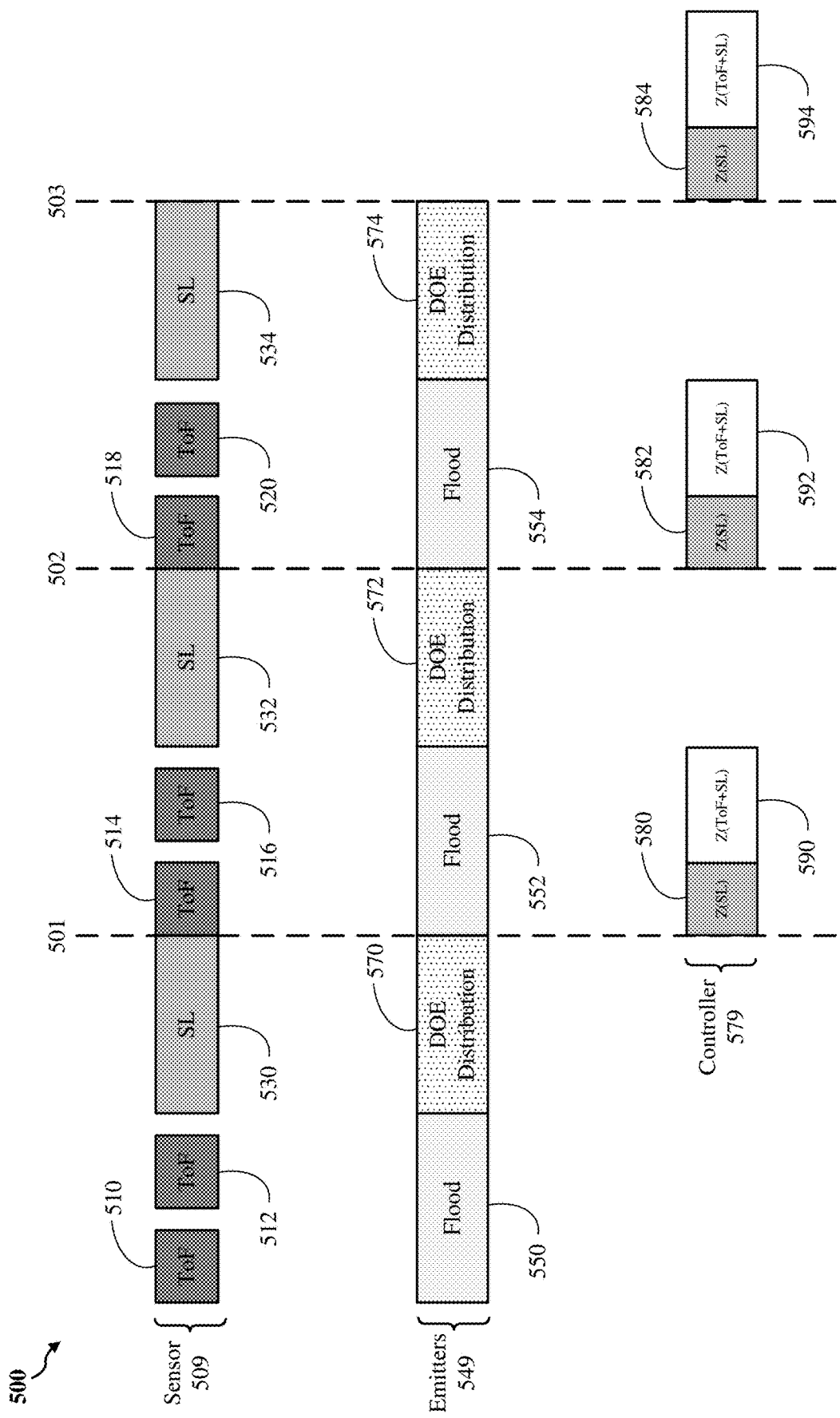

WIDE-ANGLE 3D SENSING

CROSS-REFERENCE TO RELATED APPLICATION

This Patent Application is related to U.S. patent application Ser. No. 16/682,530, entitled "MIXED ACTIVE DEPTH" and filed on Nov. 13, 2019, which is assigned to the assignee hereof and is considered part of and incorporated by reference in this Patent Application.

TECHNICAL FIELD

This disclosure relates generally to depth sensing systems and specifically to improving the speed and accuracy at which active depth systems generate depth information.

DESCRIPTION OF THE RELATED TECHNOLOGY

A passive depth sensing system measures ambient light reflected from objects or surfaces in a scene to determine distances between the sensing system and the objects or surfaces. An active depth sensing system emits light pulses into a scene and measures reflections of the light pulses from objects or surfaces in the scene to determine the distances between the sensing system and the objects or surfaces. Some active depth sensing systems may employ diffractive optical elements (DOEs) to diffract the emitted light pulses into additional emissions that can increase the number of light projections onto the scene. In some instances, the additional emissions can be used to create (and replicate) coded patterns of light onto the scene.

The maximum diffraction angle of coded light patterns created by a DOE, and thus the field of view (FOV) of the depth sensing system, may be limited by the DOE's feature size. For depth sensing systems that employ vertical-cavity surface-emitting lasers (VCSELs), distortion increases as the fanout angle increases, which may further limit the FOV. Although the FOV of a depth sensing system may be effectively doubled by using two light projectors, image artifacts associated with stitching together depth information generated from reflections of light emitted from different light projectors may prevent (or at least render impractical) the detection of objects and surfaces positioned along the "stitching area" of the scene.

SUMMARY

The systems, methods, and devices of this disclosure each have several innovative aspects, no single one of which is solely responsible for the desirable attributes disclosed herein.

Some aspects of the present disclosure relate to a device for depth sensing. An example device includes a first light projector, a second light projector, a reflective component, and a receiver. An example first light projector is configured to project light towards an example second light projector configured to project light towards the example first light projector. An example reflective component is positioned between the first and second example light projectors and configured to redirect the light projected by the example first light projector onto a first portion of a scene and to redirect the light projected by the example second light projector onto a second portion of the scene. The first and second portions of the scene may be adjacent to one another and non-overlapping relative to one another. An example receiver is configured to detect reflections of redirected light projected by the first and second light projectors.

Some other aspects of the present disclosure relate to a method for depth sensing using a device. An example method includes projecting light from a first light projector of a device towards a second light projector of the device. The example method further includes projecting light from the second light projector towards the first light projector. The example method further includes redirecting, via a reflective component positioned between the first and second light projectors, the light projected by the first light projector onto a first portion of a scene and the light projected by the second light projector onto a second portion of the scene. The first and second portions of the scene may be adjacent to one another and non-overlapping relative to one another. The example method further includes detecting reflections of redirected light projected by the first and second light projectors.

Some other aspects of the present disclosure relate to a non-transitory computer-readable medium storing instructions that, when executed by one or more processors of an device, causes the device to perform operations. Example operations include projecting light from a first light projector of the device towards a second light projector of the device. The example operations further include projecting light from the second light projector towards the first light projector. The example operations further include redirecting, via a reflective component positioned between the first and second light projectors, the light projected by the first light projector onto a first portion of a scene and the light projected by the second light projector onto a second portion of the scene. The first and second portions of the scene may be adjacent to one another and non-overlapping relative to one another. The example operations further include detecting reflections of redirected light projected by the first and second light projectors.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 1 shows an example time-of-flight (ToF) system.

FIG. 5 shows a timing diagram illustrating example operation timings for multiple components of a ToF and SL system.

Like reference numbers and designations in the various drawings indicate like elements.

DETAILED DESCRIPTION

Figure 2A:
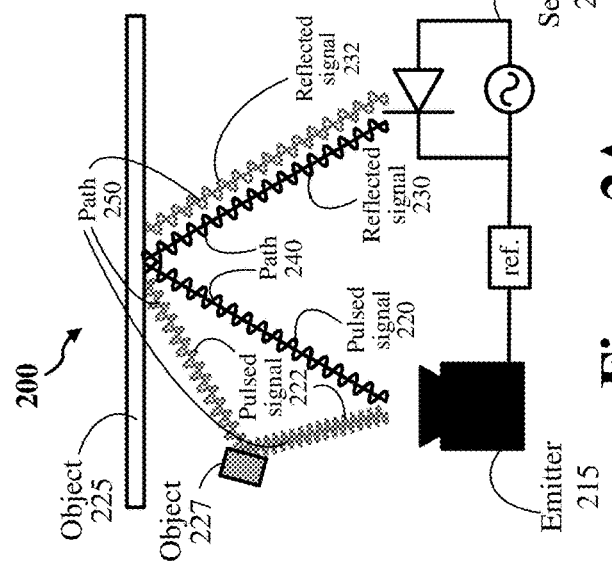
FIG. 2A shows an example environment in which multipath interference (MPI) may affect ToF depth sensing.

Implementations of the subject matter described in this disclosure may allow the field of view (FOV) of an active depth sensing system to be increased beyond the limitations imposed by the feature size of diffractive optical elements (DOEs) and the maximum fanout angles associated with vertical-cavity surface-emitting lasers (VCSELs) without distortion, thereby allowing for wide-angle 3D sensing by a relatively compact active depth sensing system. In some implementations, the active depth sensing system may include a first light projector configured to project light in a first direction, a second light projector configured to project light in a second direction opposite to the first direction, and a reflective component positioned between the first and second light projectors. The reflective component may be configured to redirect the light projected by the first light projector onto a first portion of a scene and to redirect the light projected by the second light projector onto a second portion of the scene that is adjacent to, but does not overlap, the first portion of the scene. The active depth sensing system may also include a controller that generates depth information based on reflections of the redirected light from the first and second portions of the scene while correcting for projection distortion based at least in part on one or more angles of refraction associated with the reflective component.

In some implementations, the reflective component may include first and second reflective elements. The first reflective element may be or include a prism configured to fold the optical path of light projected from the first light projector and refract the folded light onto the first portion of the scene based at least in part on the folded optical path. The second reflective element may be or include a prism configured to fold the optical path of light projected from the second light projector and refract the folded light onto the second portion of the scene based at least in part on the folded optical path. The prisms and folded optics employed by the reflective component may allow the active depth sensing system to seamlessly stitch together depth information generated from reflections of light emitted from the first and second light projectors without stitch artifacts.

The active depth sensing system may also include switchable diffusers configured to transition the light projectors between a time-of-flight (ToF) sensing mode and a structured light (SL) sensing mode. In this manner, the active depth sensing system may reap advantages offered by both ToF and SL techniques while minimizing their respective disadvantages.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processes, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," or the like, refer to the actions and processes of a computer system, or similar electronic computing device, that manipulates and transforms data represented as physical (electronic) quantities within the computer system registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to two light projectors, aspects of the present disclosure are applicable to devices having any number of light projectors, and are therefore not limited to specific devices.

The term "device" is not limited to one or a specific number of physical objects (such as one smartphone, one controller, one processing system, and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

FIG. 1 shows an example ToF system 100. The ToF system 100 may be used to generate depth information of a scene including a surface 106, or may be used for other applications for ranging surfaces or other portions of the scene. The ToF system 100 may include a transmitter 102 and a receiver 108. The transmitter 102 may be referred to as a "light projector," "transmitter," "projector," "emitter," and so on, and should not be limited to a specific transmission component. Similarly, the receiver 108 may be referred to as a "light sensor," "detector," "sensor," "sensing element," "photodetector," and so on, and should not be limited to a specific receiving component.

The transmitter 102 may be configured to transmit, emit, or project signals (such as a field of light) onto the scene. While ToF systems are described in the examples as emitting light (which may include near-infrared (NIR)), signals at other frequencies may be used, such as microwaves, radio frequency signals, sound, and so on. The present disclosure should not be limited to a specific range of frequencies for the emitted signals.

The transmitter 102 transmits light 104 toward a scene including a surface 106. The transmitted light 104 includes light pulses 114 at known time intervals (such as periodically). The receiver 108 includes a sensor 110 to sense the reflections 112 of the transmitted light 104. The reflections 112 include the reflected light pulses 116, and the ToF system 100 determines a round trip time 122 for the light by comparing the timing 118 of the transmitted light pulses to the timing 120 of the reflected light pulses 116. The light pulses may be modulated continuous-wave (AMCW) pulses of light. In some instances, the light reflected back to the receiver 108 may have a different phase than the light emitted from the transmitter 102. The phase difference may be used to determine the round trip time of the emissions. The distance of the surface 106 from the ToF system 100 may be calculated to be half the round trip time multiplied by the speed of the emissions (such as the speed of light for light emissions).

The sensor 110 may include an array of photodiodes to measure or sense the reflections. Alternatively, the sensor 110 may include a CMOS sensor or other suitable photosensitive sensor including a number of pixels or regions for sensing. The ToF system 100 identifies the reflected light pulses 116 as sensed by the sensor 110 when the magnitudes of the pulses are greater than a value. For example, the ToF system 100 measures a magnitude of the ambient light and other interference without the signal and determines if further measurements are greater than the previous measurement by a value.

In some implementations, the sensor 110 may include a sensor pixel including a photodiode (not shown for simplicity) for converting photons from the reflections 112 into electrical current. The sensor pixel may include one or more capacitors to store energy from the current. The ToF system 100 may calculate a distance between the ToF system 100 and the surface 106 in part by comparing the voltages with their corresponding phases. The ToF system 100 may open and close a shutter to expose the sensor 110 at a number of particular phase offsets relative to the pulsed signal. During each exposure cycle, electrical charge may be stored by one or more storage elements, such as by capacitors.

As a non-limiting example, during a first exposure cycle, a first capacitor (C1) may store a charge (Q1) and a second capacitor (C2) may store a charge (Q2), where Q1 is the accumulated charge from the reflected signal when the shutter is open at a 0° phase offset, and where Q2 is the accumulated charge from the reflected signal when the shutter is open at a 180° phase offset. During a second exposure cycle, C1 may store a charge (Q3) and C2 may store a charge (Q4), where Q3 is the accumulated charge from the reflected signal when the shutter is open at a 90° phase offset, and where Q4 is the accumulated charge from the reflected signal when the shutter is open at a 270° phase offset. The ToF system 100 can calculate the phase offset ($\varphi$) between the pulsed signal and the reflected signal based on the charges stored across C1 and C2 for each of the exposure cycles:

$$\varphi = \tan^{-1} \frac{Q3 - Q4}{Q1 - Q2}$$

The calculated phase offset $\varphi$ between the pulsed signal and the reflected signal is proportional to the distance d between the corresponding sensor pixel and the surface 106:

$$d = \left(\frac{c}{2f}\right) * \left(\frac{\varphi}{2\pi}\right)$$

where c is the speed of light and f is the frequency of the modulated signal. Based on the determined distances from each pixel of the sensor 110 to the surface 106, the ToF system 100 may generate depth information for the surface 106.

Some environments (e.g., with corners, convex areas, and/or reflective surfaces) may cause different pulses of light to arrive at the ToF system 100 along multiple reflection paths and recombine at the sensor 110, which is known as MPI. For purposes of discussion herein, MPI may also be referred to as "multipath effects" or "MPI effects." MPI may cause the ToF system to overestimate the amount of charge being accumulated for one or more phase offsets of the corresponding pulsed signal. The overestimation may cause the ToF system to inaccurately calculate the corresponding phase shift φ between the pulsed and reflected signals. Thus, the ToF system may inaccurately calculate the corresponding distance d from one or more of the sensor pixels to the object or scene, which may cause distortions (or "bumps") in corresponding depth information.

FIG. 2A shows an example environment 200 in which MPI may affect ToF depth sensing. The ToF system includes an emitter 215 and a sensor 235. The scene includes an object 225 and an object 227. The object 227 may have a mirror-like surface. The emitter 215 transmits a pulsed signal 220 and a pulsed signal 222 toward the object 225. The pulsed signal 220 and the reflected signal 230 follow a direct path 240 to the sensor 235. In contrast, the pulsed signal 222 and the reflected signal 232 follow an indirect path 250 (e.g., reflecting off of the object 227) to the sensor 235 such that the reflected signal 232 may arrive at the sensor 235 at a different time than the reflected signal 230. In some aspects, the sensor 235 may interpret the reflected signals 230 and 232 as being reflected from the same location on object 225. As such, when the reflected signals 230 and 232 arrive at the sensor 235 at two different times, the sensor 235 may generate two different distances for the location on object 225, causing MPI.

Figure 2C:
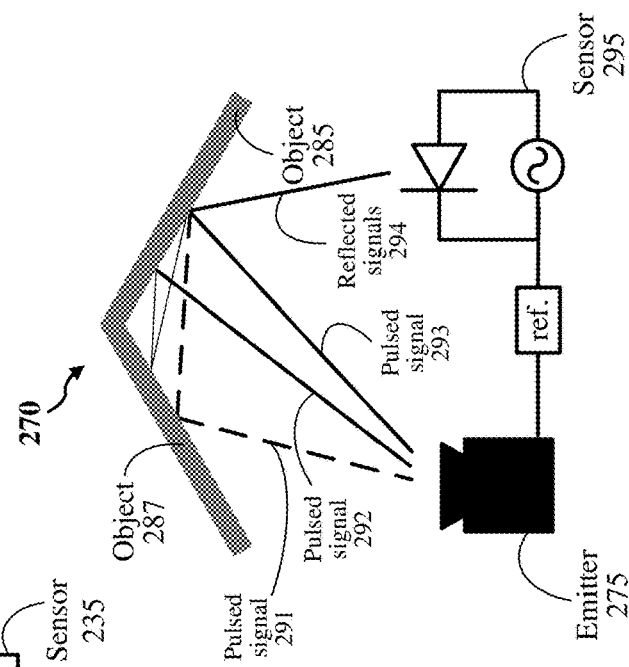
FIG. 2C shows another example environment in which MPI may affect ToF depth sensing.
Figure 2B:
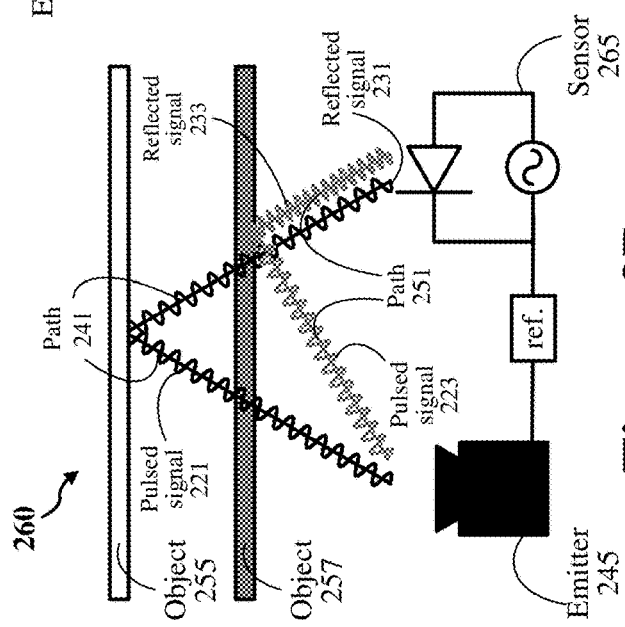
FIG. 2B shows another example environment in which MPI may affect ToF depth sensing.

FIG. 2B shows another example environment 260 in which MPI may affect ToF depth sensing. The ToF system includes an emitter 245 and a sensor 265. The scene includes an object 255 and an object 257. The object 257 may have a semi-transparent surface. The emitter 245 transmits a pulsed signal 221 and a pulsed signal 223. The pulsed signal 221 and the reflected signal 231 follow path 241 (e.g., reflecting off of the object 255). The pulsed signal 223 and the reflected signal 233 follow path 251 (e.g., reflecting off of the object 257). The reflected signal 233 may arrive at the sensor 265 at a different time than the reflected signal 231. In some aspects, the sensor 265 may interpret the reflected signals 231 and 233 as being reflected from the same location on object 255. As such, when the reflected signals 231 and 233 arrive at the sensor 265 at two different times, the sensor 265 may generate two different distances for the location on object 255, causing MPI.

FIG. 2C shows another example environment 270 in which MPI may affect ToF depth sensing. The ToF system includes an emitter 275 and a sensor 295. The scene includes an object 285 and an object 287, which may represent two walls that intersect at a corner point. The emitter 275 transmits a pulsed signal 291, a pulsed signal 292, and a pulsed signal 293, and the sensor 295 receives corresponding reflected signals 294. Possibly due to the reflective properties of the object 285 or the object 287, two or more of the reflected signals 294 may arrive at the sensor 295 at a different time. In some aspects, the sensor 295 may interpret each of the reflected signals 294 as being reflected from the same location on object 285 or object 287. As such, if two or more of the reflected signals 294 arrive at the sensor 295 at different times, the sensor 295 may generate two or more different distances for the location on object 285 or 287, causing MPI. For example, a conventional ToF system may superimpose multiple of the reflected signals 294, resulting in accurate distance calculations for the corresponding location on object 285 or object 287, and ultimately resulting in one or more regions in a corresponding depth map (not shown for simplicity) inaccurately appearing to have a uniform depth.

Figure 3:
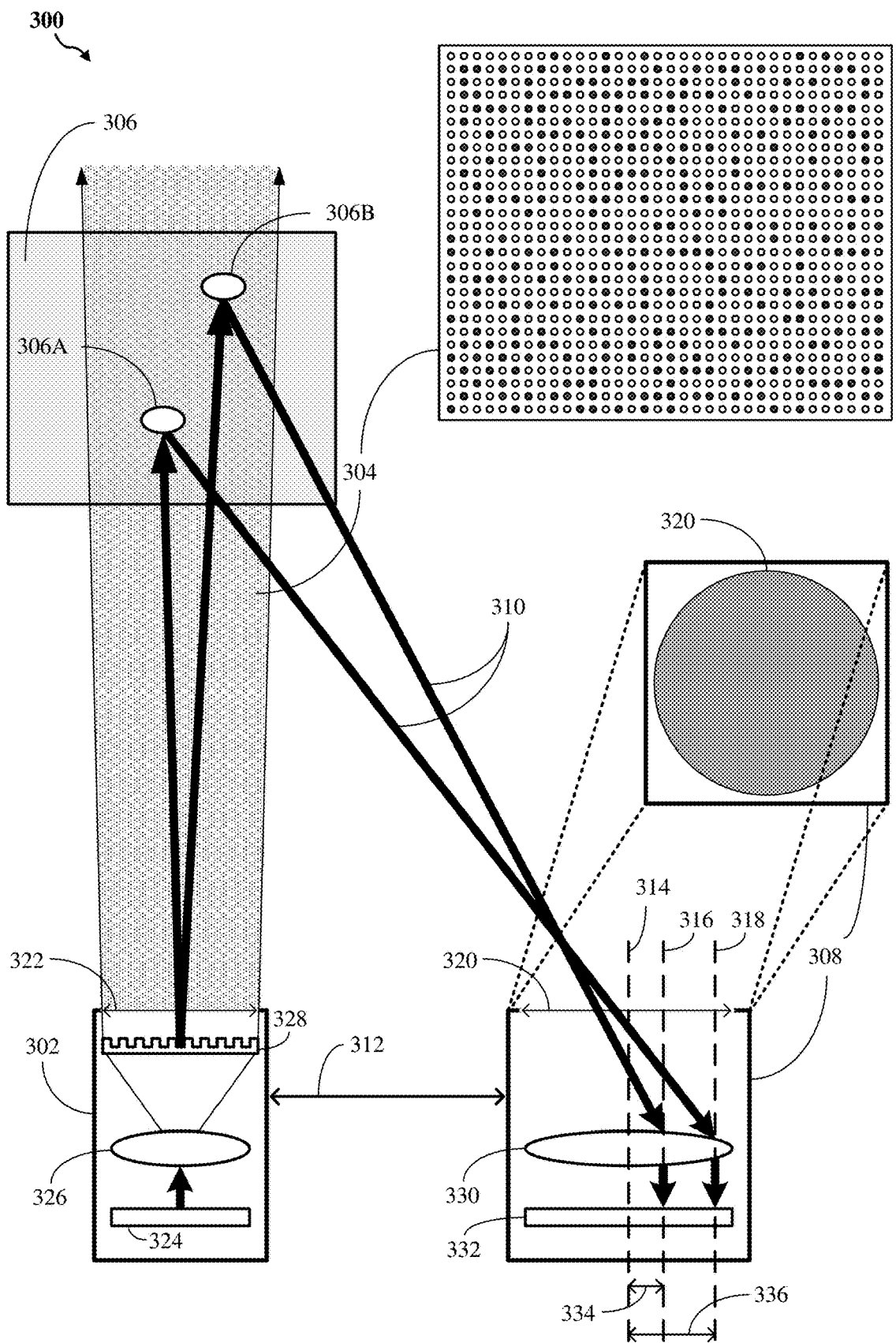
FIG. 3 shows an example structured light (SL) system.

FIG. 3 shows an example SL system 300. A SL system may transmit light in a distribution of points (or another suitable shape of focused light). For purposes of discussion herein, the distribution of points may be referred to as a "pattern," a "SL pattern," a "dot pattern," or the like, and the pattern may be predefined. The points of light may be projected on to a scene, and the reflections of the points of light may be received by the SL system. Depths of objects in a scene may be determined by comparing the pattern of the received light and the pattern of the transmitted light. In comparing the patterns, a portion of the predefined distribution for the transmitted light may be identified in the received light. A SL system may project a distribution of light (such as a distribution of light points or other shapes) using a SL projector.

The SL system 300 (which herein may also be called a SL system) may be used to generate depth information for a scene 306. For example, the scene 306 may include a face, and the SL system 300 may be used for identifying or authenticating the face. The SL system 300 may include a transmitter 302 and a receiver 308. The transmitter 302 may be referred to as a "transmitter," "projector," "emitter," and so on, and should not be limited to a specific transmission component. Throughout the following disclosure, the terms projector and transmitter may be used interchangeably. The receiver 308 may be referred to as a "detector," "sensor," "sensing element," "photodetector," and so on, and should not be limited to a specific receiving component.

While the disclosure refers to the distribution as a light distribution, any suitable signals at other frequencies may be used (such as radio frequency waves, sound waves, etc.). Further, while the disclosure refers to the distribution as including a plurality of light points, the light may be focused into any suitable size and dimensions. For example, the light may be projected in lines, squares, or any other suitable dimension. In addition, the disclosure may refer to the distribution as a codeword distribution, where a defined portion of the distribution (such as a predefined patch of light points) is referred to as a codeword. If the distribution of the light points is known, the codewords of the distribution may be known. However, the distribution may be organized in any way, and the present disclosure should not be limited to a specific type of distribution or type of signal or pulse.

The transmitter 302 may be configured to project or transmit a distribution 304 of light points onto the scene 306. The white circles in the distribution 304 may indicate where no light is projected for a possible point location, and the black circles in the distribution 304 may indicate where light is projected for a possible point location. In some example implementations, the transmitter 302 may include one or more light sources 324 (such as one or more lasers), a lens 326, and a light modulator 328. The transmitter 302 may also include an aperture 322 from which the transmitted light escapes the transmitter 302. In some implementations, the transmitter 302 may further include a diffractive optical element (DOE) to diffract the emissions from one or more light sources 324 into additional emissions. In some aspects, the light modulator 328 may include a DOE, for example, to adjust the intensity of the emission. In projecting the distribution 304 of light points onto the scene 306, the transmitter 302 may transmit one or more lasers from the light source 324 through the lens 326 (and/or through a DOE or light modulator 328) and onto the scene 306. The transmitter 302 may be positioned on the same reference plane as the receiver 308, and the transmitter 302 and the receiver 308 may be separated by a distance called the baseline (312).

In some example implementations, the light projected by the transmitter 302 may be infrared (IR) light. IR light may include portions of the visible light spectrum and/or portions of the light spectrum that is not visible to the naked eye. In one example, IR light may include NIR light, which may or may not include light within the visible light spectrum, and/or IR light (such as far infrared (FIR) light) which is outside the visible light spectrum. The term IR light should not be limited to light having a specific wavelength in or near the wavelength range of IR light. Further, IR light is provided as an example emission from the transmitter. In the following description, other suitable wavelengths of light may be used, such as, for example, light in portions of the visible light spectrum outside the IR light wavelength range or ultraviolet light. Alternatively, other signals with different wavelengths may be used, such as microwaves, radio frequency signals, and other suitable signals.

The scene 306 may include objects at different depths from the SL system (such as from the transmitter 302 and the receiver 308). For example, objects 306A and 306B in the scene 306 may be at different depths. The receiver 308 may be configured to receive, from the scene 306, reflections 310 of the transmitted distribution 304 of light points. To receive the reflections 310, the receiver 308 may capture an image. When capturing the image, the receiver 308 may receive the reflections 310, as well as (i) other reflections of the distribution 304 of light points from other portions of the scene 306 at different depths and (ii) ambient light. Noise may also exist in the captured image.

In some example implementations, the receiver 308 may include a lens 330 to focus or direct the received light (including the reflections 310 from the objects 306A and 306B) on to the sensor 332 of the receiver 308. The receiver 308 may also include an aperture 320. Assuming for the example that only the reflections 310 are received, depths of the objects 306A and 306B may be determined based on the baseline 312, displacement and distortion of the light distribution 304 (such as in codewords) in the reflections 310, and intensities of the reflections 310. For example, the distance 334 along the sensor 332 from location 316 to the center 314 may be used in determining a depth of the object 306B in the scene 306. Similarly, the distance 336 along the sensor 332 from location 318 to the center 314 may be used in determining a depth of the object 306A in the scene 306. The distance along the sensor 332 may be measured in terms of number of pixels of the sensor 332 or a distance (such as millimeters).

In some example implementations, the sensor 332 may include an array of photodiodes (such as avalanche photodiodes) for capturing an image. To capture the image, each photodiode in the array may capture the light that hits the photodiode and may provide a value indicating the intensity of the light (a capture value). The image therefore may be the capture values provided by the array of photodiodes.

In addition or alternative to the sensor 332 including an array of photodiodes, the sensor 332 may include a complementary metal-oxide semiconductor (CMOS) sensor. To capture the image by a photosensitive CMOS sensor, each pixel of the sensor may capture the light that hits the pixel and may provide a value indicating the intensity of the light. In some example implementations, an array of photodiodes may be coupled to the CMOS sensor. In this manner, the electrical impulses generated by the array of photodiodes may trigger the corresponding pixels of the CMOS sensor to provide capture values.

The sensor 332 may include at least a number of pixels equal to the number of possible light points in the distribution 304. For example, the array of photodiodes or the CMOS sensor may include a number of photodiodes or a number of pixels, respectively, corresponding to the number of possible light points in the distribution 304. The sensor 332 logically may be divided into groups of pixels or photodiodes (such as 4×4 groups) that correspond to a size of a bit of a codeword. The group of pixels or photodiodes may also be referred to as a bit, and the portion of the captured image from a bit of the sensor 332 may also be referred to as a bit. In some example implementations, the sensor 332 may include the same number of bits as the distribution 304.

If the light source 324 transmits IR light (such as NIR light at a wavelength of, e.g., 940 nm), the sensor 332 may be an IR sensor to receive the reflections of the NIR light. As illustrated, the distance 334 (corresponding to the reflections 310 from the object 306B) is less than the distance 336 (corresponding to the reflections 310 from the object 306A). Using triangulation based on the baseline 312 and the distances 334 and 336, the differing depths of objects 306A and 306B in the scene 306 may be determined in generating depth information for the scene 306. Determining the depths may further include determining a displacement or a distortion of the distribution 304 in the reflections 310.

Although multiple separate components are illustrated in FIG. 3, one or more of the components may be implemented together or include additional functionality. All described components may not be required for a SL system 300, or the functionality of components may be separated into separate components. Additional components not illustrated may also exist. For example, the receiver 308 may include a bandpass filter to allow signals having a determined range of wavelengths to pass onto the sensor 332 (thus filtering out signals with a wavelength outside of the range). In this manner, some incidental signals (such as ambient light) may be prevented from interfering with the captures by the sensor 332. The range of the bandpass filter may be centered at the transmission wavelength for the transmitter 302. For example, if the transmitter 302 is configured to transmit NIR light with a wavelength of 940 nm, the receiver 308 may include a bandpass filter configured to allow NIR light having wavelengths within a range of, e.g., 920 nm to 960 nm. Therefore, the examples described regarding FIG. 3 are for illustrative purposes, and the present disclosure should not be limited to the example SL system 300.

For a light projector (such as the transmitter 302), the light source may be any suitable light source. In some example implementations, the light source 324 may include one or more distributed feedback (DFB) lasers. In some other example implementations, the light source 324 may include one or more vertical-cavity surface-emitting lasers (VCSELs).

A DOE is a material situated in the projection path of the light from the light source. The DOE may be configured to split a light point into multiple light points. For example, the material of the DOE may be a translucent or a transparent polymer with a known refractive index. The surface of the DOE may include peaks and valleys (varying the depth of the DOE) so that a light point splits into multiple light points when the light passes through the DOE. For example, the DOE may be configured to receive one or more light points from one or more lasers and project an intended distribution with a greater number of light points than emitted by the one or more lasers. While the Figures may illustrate the depth of a DOE changing along only one axis of the DOE, the Figures are only to assist in describing aspects of the disclosure. The peaks and valleys of the surface of the DOE may be located at any portion of the surface of the DOE and cause any suitable change in the depth of portions of the DOE, and the present disclosure should not be limited to a specific surface configuration for a DOE.

Figure 4:
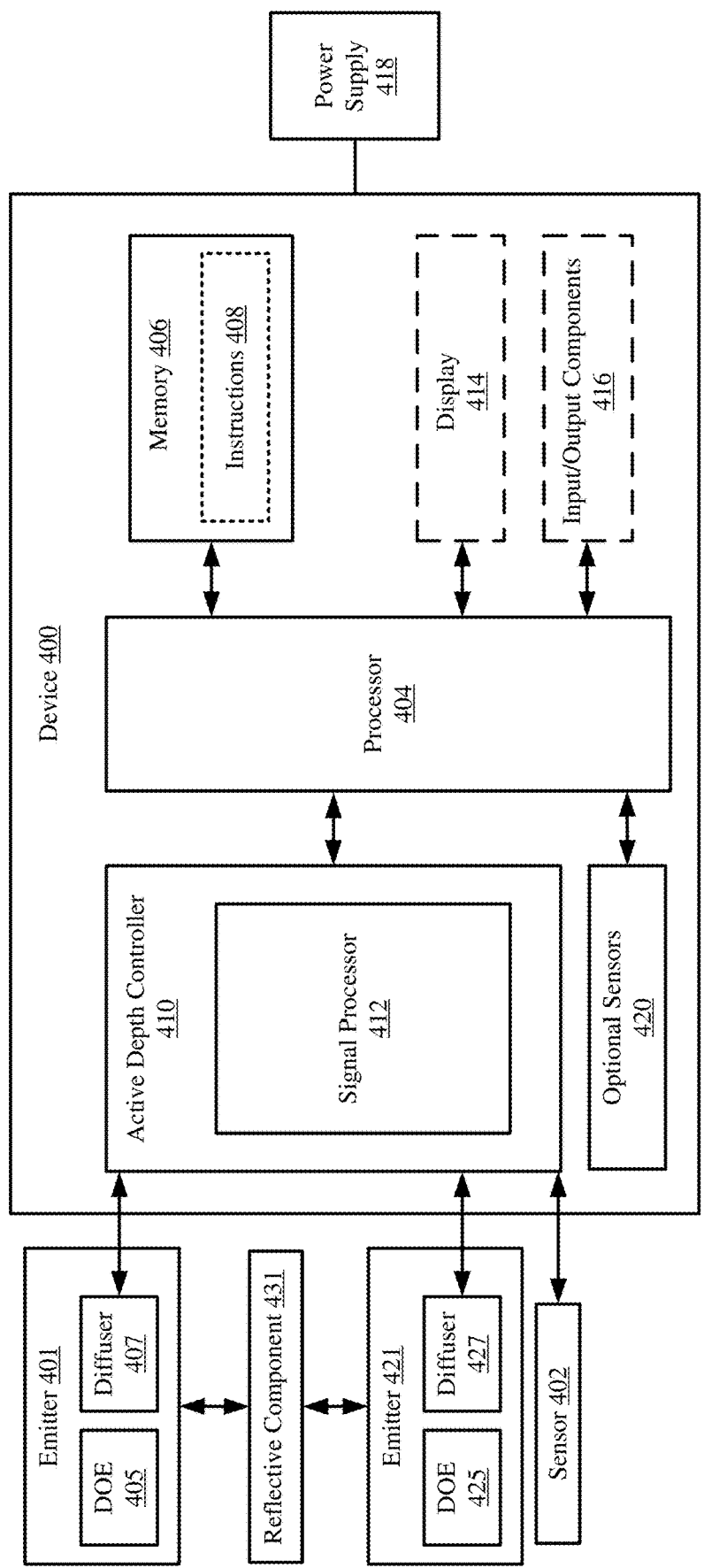
FIG. 4 shows a block diagram of an example device including a mixed ToF and SL system.

FIG. 4 shows a block diagram of an example device 400 configured for active depth sensing using ToF and SL techniques. It will be understood that ToF and SL are example active depth techniques and that the device 400 may use other active depth techniques in some implementations. In some embodiments, the device 400 may be configured to generate depth information using ToF techniques while using SL techniques to mitigate the effects of MPI in the depth information. The device 400 may include or be coupled to an emitter 401 (a "first emitter"), a sensor 402, a processor 404, a memory 406 storing instructions 408, and an active depth controller 410 (which may include one or more signal processors 412). The emitter 401 may include or be coupled to a DOE 405. The DOE 405 may optionally be included in or coupled to the device 400. The emitter 401 may include or be coupled to a diffuser 407. The diffuser 407 may optionally be included in or coupled to the device 400.

The device 400 may further include or be coupled to an emitter 421 (a "second emitter"). In some implementations, the emitter 421 may be the same or similar to the emitter 401. The emitter 421 may include or be coupled to a DOE 425, which may be the same or similar to the DOE 405. The DOE 425 may optionally be included in or coupled to the device 400. The emitter 421 may include or be coupled to a diffuser 427, which may be the same or similar to the diffuser 407. The diffuser 427 may optionally be included in or coupled to the device 400. Aspects of the present disclosure described with respect to one or more of the emitter 401, the DOE 405, or the diffuser 407 may also apply for one or more of the emitter 421, the DOE 425, or the diffuser 427, respectively.

A reflective component 431 may be positioned between the emitter 401 and the emitter 421. The reflective component 431 may optionally be included in or coupled to one or more of the device 400, the emitter 401, or the emitter 421. In some implementations, the reflective component 431 may be configured to redirect light projected by the emitter 401 onto a first portion of a scene and to redirect light projected by the emitter 421 onto a second portion of the scene, as is further described with respect to FIGS. 6A and 6B.

For purposes of discussion herein, the device 400 may be referred to as a "ToF and SL system." Further for purposes of discussion herein, the "ToF and SL system" may instead refer to just one or more components of the device 400 (e.g., one or more of the active depth controller 410, the emitter 401, the sensor 402, the DOE 405, the diffuser 407, the emitter 421, the DOE 425, the diffuser 427, or the reflective component 431) or any other components that may be used for active depth sensing.

In some embodiments, one or more of the emitter 401 or the emitter 421 may be a single, hybrid laser projector capable of switching between projecting a first distribution of light (e.g., with use of one or more of the diffuser 407 or the diffuser 427) during a first projection mode (e.g., a ToF projection mode) of one or more of the emitter 401 or the emitter 421 and projecting a second distribution of light (e.g., with use of one or more of the DOE 405 or the DOE 425) during a second projection mode (e.g., a SL projection mode) of one or more of the emitter 401 or the emitter 421. When operating in the SL projection mode, the DOEs 405 and 425 may enable the emitters 401 and 421, respectively, to transmit the second distribution of light, which may be, for example, a known DOE dot pattern, a codeword DOE projection, or the like. The diffusers 407 and 427 may be switchable such that the diffuser is "off" (or "disabled" or "switched off") when the device 400 operates in the SL projection mode and is "on" (or "enabled" or "switched on") when the device 400 operates in the ToF projection mode.

More specifically, when operating in the ToF projection mode, the respective diffuser of the diffusers 407 and 427 is switched on, which causes the respective emitter of the emitters 401 and 421 to transmit the second distribution of light (e.g., flood distribution). Accordingly, the emitters 401 and 421 may be synchronized to project a second distribution of light (e.g., a DOE distribution) during the SL projection mode and a second distribution of light (e.g., a full flood frame) during a ToF projection mode. In some aspects, one or more of the distributions of light may be time-modulated, as described with respect to FIG. 1. In some embodiments, one or more of the emitter 401 and the emitter 421 may include multiple projectors.

In some embodiments, the sensor 402 may be a single, hybrid ToF and SL sensor for receiving reflected light according to ToF and SL sensing (or "readout") modes. The sensor 402 may be configured to switch between operating in a first sensing mode (e.g., a ToF sensing mode) and a second sensing mode (e.g., a SL sensing mode). For example, the sensor 402 may be a composite CMOS image sensor configured to switch between operating in (or alternating between) the ToF and SL sensing modes. The sensing mode may depend on which distribution (e.g., DOE or flood) the respective emitter of the emitters 401 and 421 are projecting. In some aspects, the sensor 402 may be based on a monolithic pixel array architecture, for example, with Time-Division Multiplexed Read (TDMR) capabilities. In other embodiments, the sensor 402 may include one or more generic ToF sensors operating in conjunction with multiple projectors.

In some embodiments, the active depth controller 410 may be a computation element for calculating depth information. The active depth controller 410 may be configured to alternate between computing depth information using ToF techniques and computing depth information using SL techniques. For purposes of discussion herein, depth information calculated using SL techniques may also be referred to as "SL depth information," "SL information," or the like. Similarly, for purposes of discussion herein, depth information calculated using ToF techniques may also be referred to as "ToF depth information," "ToF information," or the like. In some aspects, the active depth controller 410 may use SL depth information as reference for calculating or supplementing ToF depth information, which may help compensate for MPI errors in the ToF depth information. That is, the active depth controller 410 may use the sparse depth information from the SL mode as a baseline reference to compensate for multipath effects in the depth information from the ToF mode. In this manner, the active depth controller 410 may generate high-resolution and high-accuracy depth information without MPI artifacts. In some embodiments, the sensor 402 may be a Reconfigurable Instruction Cell Array (RICA), which is a proprietary, real-time, low-power, (re)programmable, image signal processing (ISP), active sensing, processing engine. In some aspects, stacking the RICA programmable implementation with the hybrid NIR sensor described herein may enable the active depth controller 410 to switch programming "on-the-fly" to toggle computing SL depth information and ToF depth information while reducing a number of components for a sensor (e.g., the sensor 402). In other embodiments, the active depth controller 410 may be a generic sensor.

In some aspects, the active depth controller 410 may be configured to control (or otherwise operate) one or more of the emitter 401, the emitter 421, or the sensor 402 to synchronize their respective operating modes, such that the sensor 402 and the emitters 401 and 421 concurrently operate in either their respective SL modes or ToF modes. In some aspects, the active depth controller 410 may be controlled, work in conjunction with, or otherwise be operated by one or more other components of the device 400, such as at least one of the processor 404 or the memory 406.

The device 400 may optionally include or be coupled to a display 414 and a number of input/output (I/O) components 416. The sensor 402 may be, or otherwise may be coupled to, a camera, such as a single camera, a dual camera module, or a module with any number of other camera sensors (not pictured). The signal processor 412 may be configured to process captures from the sensor 402. The device 400 may further include one or more optional sensors 420 (such as a gyroscope, magnetometer, inertial sensor, NIR sensor, and so on) coupled to the processor 404. The device 400 may also include a power supply 418, which may be coupled to or integrated into the device 400. The device 400 may include additional features or components not shown.

The memory 406 may be a non-transient or non-transitory computer readable medium storing computer-executable instructions 408 to perform all or a portion of one or more operations described in this disclosure. The processor 404 may be one or more suitable processors capable of executing scripts or instructions of one or more software programs (such as instructions 408) stored within the memory 406. In some aspects, the processor 404 may be one or more general purpose processors that execute instructions 408 to cause the device 400 to perform any number of functions or operations. In additional or alternative aspects, the processor 404 may include integrated circuits or other hardware to perform functions or operations without the use of software. While shown to be coupled to each other via the processor 404 in the example of FIG. 4, the processor 404, the memory 406, the active depth controller 410, the optional display 414, the optional I/O components 416, and the optional sensors 420 may be coupled to one another in various arrangements. For example, the processor 404, the memory 406, the active depth controller 410, the optional display 414, the optional I/O components 416, and/or the optional sensors 420 may be coupled to each other via one or more local buses (not shown for simplicity).

The display 414 may be any suitable display or screen allowing for user interaction and/or to present items (such as depth information or a preview image of the scene) for viewing by a user. In some aspects, the display 414 may be a touch-sensitive display. The I/O components 416 may be or include any suitable mechanism, interface, or device to receive input (such as commands) from the user and to provide output to the user. For example, the I/O components 416 may include (but are not limited to) a graphical user interface, keyboard, mouse, microphone and speakers, squeezable bezel or border of the device 400, physical buttons located on device 400, and so on. The display 414 and/or the I/O components 416 may provide a preview image or depth information for the scene to a user and/or receive a user input for adjusting one or more settings of the device 400 (such as adjusting an intensity of emissions by one or more of the emitter 401 or the emitter 421, determining or switching one or more operating modes of the device 400, adjusting a field of emission of by one or more of the emitter 401 or the emitter 421, and so on).

The active depth controller 410 may include, or may otherwise be coupled to, a signal processor 412, which may be one or more processors to process captures from the sensor 402. The active depth controller 410 may be configured to switch at least one of the emitter 401, the emitter 421, or the sensor 402 between one or more operating modes. The active depth controller 410 may alternatively or additionally include a combination of specific hardware and the ability to execute software instructions.

One or more of the emitter 401 or the emitter 421 may vary its field of emission for different operating modes. In some example implementations, one or more of the emitter 401 or the emitter 421 may include a focusing apparatus for adjusting the size of the field of emission/transmission. In one example, mirrors attached to actuators (such as microelectromechanical systems (MEMS) actuators) may adjust the focus of the light emissions from the respective emitter of the emitters 401 and 421. In another example, an adjustable holographic optical element (HOE) may adjust the focus of the light emissions from the respective emitter of the emitters 401 and 421. In a further example, a formable DOE (such as a piezoelectric material to adjust the shape) may be adjusted to focus the diffracted points of light emitted.

In some other example implementations, the device 400 may emit light using a plurality of light emitters (not shown) instead of, or in combination with, the emitters 401 and 421. The emitters may include a first group of light emitters (e.g., of a first array of light emitters) for emitting light with a first field of transmission. The emitters may further include a second or different group of light emitters (e.g., of a second array of light emitters) for emitting light with a second field of transmission. The first field may be larger than the second field at a common depth from one or more of the emitter 401 or the emitter 421. In some example implementations, the first group of light emitters may be active for a first mode of the respective emitter of the emitters 401 and 421, and the second group of light emitters may be active for a second mode of the respective emitter of the emitters 401 and 421.

FIG. 5 shows a timing diagram 500 illustrating an example operation of a ToF and SL system including a sensor 509, emitters 549, and a controller 579. The sensor 509, emitters 549, and controller 579 may be example embodiments of the sensor 402, emitters 401 and 421, and active depth controller 410, respectively, of FIG. 4. It will be understood that ToF and SL are example active depth techniques and that the system may use other active depth techniques in some implementations.

The example timing diagram 500 shows three projection cycles for the emitters 549: a first projection cycle ending at time 501, a second projection cycle ending at time 502, and a third projection cycle ending at time 503. Each of the emitters 549 may project a first distribution of light during each of the projection cycles. The first distribution of light may be a flood distribution for a first projection mode, such as a ToF projection mode. For example, each of the emitters 549 may project a flood distribution 550, a flood distribution 552, and a flood distribution 554 during a ToF projection mode for each of the first, second, and third projection cycles, respectively. For purposes of discussion herein, a flood distribution may also be referred to as a "flood illumination" or a "diffuse light." In some aspects, one or more of the flood distributions may be time-modulated, as described with respect to FIGS. 1 and 4. Each of the emitters 549 may also project a second distribution of light during each of the projection cycles. The second distribution of light may be a DOE distribution for a second projection mode, such as a SL projection mode. For example, each of the emitters 549 may project a DOE distribution 570, a DOE distribution 572, and a DOE distribution 574 during the SL projection mode for each of the first, second, and third projection cycles, respectively. For purposes of discussion herein, a DOE distribution may also be referred to as a "DOE pattern," a "DOE projection," a "SL distribution," a "SL pattern," and/or a "SL projection."

The example timing diagram 500 shows three sensing cycles for the sensor 509: a first sensing cycle ending at time 501, a second sensing cycle ending at time 502, and a third sensing cycle ending at time 503. The sensor 509 may read out two frames of ToF sensor data (during a ToF sensing mode) and one frame of SL sensor data (during a SL sensing mode) for each sensing cycle. The sensor 509 may be configured to operate in the ToF sensing mode at the same time as when the emitters 549 are configured to operate in the ToF projection mode. The sensor 509 may be configured to operate in the SL sensing mode at the same time as when the emitters 549 are configured to operate in the SL projection mode. During the ToF sensing mode, the emitters 549 may emit laser pulses, and the sensor 509 may be exposed at a number of particular laser pulse phase offsets (e.g., Phase 0°, Phase 180°, Phase 90°, and Phase 270°) relative to a respective pulsed signal from each of the emitters 549. The sensor 509 may accumulate and store an amount of charge (Q) for each of the particular laser pulse phase offsets (or "phase offsets").

For example, during a first exposure, the sensor 509 may read out the first frame of ToF sensor data 510 based on a Q1 and a Q2, where Q1 is the charge accumulated at 0° phase offset, and where Q2 is the charge accumulated at 180° phase offset. During a second exposure, the sensor 509 may read out a second frame of ToF sensor data 512 based on a Q3 and a Q4, where Q3 is the charge accumulated at 90° phase offset, and where Q4 is the charge accumulated at 270° phase offset. Similarly, the sensor 509 may read-out a first frame of ToF sensor data 514 and a second frame of ToF sensor data 516 during the second sensing cycle, and the sensor 509 may read-out a first frame of ToF sensor data 518 and a second frame of ToF sensor data 520 during the third sensing cycle. The sensor 509 may read-out a frame of SL sensor data 530 during the first sensing cycle, a frame of SL sensor data 532 during the second sensing cycle, and a frame of SL sensor data 534 during the third sensing cycle.

After each sensing cycle, the controller 579 may calculate SL depth information (Z(SL)) using SL sensor data. For example, the controller 579 may calculate SL depth information (Z(SL)) 580, Z(SL) 582, and Z(SL) 584 after each of the first, second, and third sensing cycle, respectively.

After calculating Z(SL), the controller 579 may use Z(SL) to reduce, filter, and/or eliminate MPI associated with the ToF sensor data for the corresponding sensing cycle. For purposes of discussion herein, the improved depth information may be referred to as Z(ToF+SL). For example, the controller 579 may calculate Z(ToF+SL) 590, Z(ToF+SL) 592, and Z(ToF+SL) 594 after calculating each of Z(SL) 580, Z(SL) 582, and Z(SL) 584, respectively. In some aspects, the controller 579 may calculate Z(ToF+SL) using one frame of ToF sensor data for the corresponding sensing cycle, or, since ToF sensing techniques are susceptible to noise, the controller 579 may calculate Z(ToF+SL) using more than one frame of ToF sensor data for the corresponding sensing cycle. In some implementations, the controller 579 may use the first frame of ToF sensor data and the second frame of ToF sensor data to calculate Z(SL) and Z(ToF+SL) any time during the next sensing cycle. As a non-limiting example, the controller 579 may average the first frame of ToF sensor data 510 with the second frame of ToF sensor data 512 to calculate Z(SL) 580 and Z(ToF+SL) 590 between time 501 and time 502. In some aspects, the controller may use frames of ToF sensor data in a different manner to calculate Z(SL) and/or Z(ToF+SL).

In this manner, the system may generate high-resolution and high-accuracy depth information without MPI artifacts using the sparse depth information from the SL mode as a baseline to eliminate multipath effects from the ToF mode. In accordance with the embodiments described herein, the system may generate the depth information without MPI artifacts using a single sensor (e.g., the sensor 509), a pair of emitters (e.g., the emitters 549), and/or a single controller (e.g., the controller 579).

Figure 6A:
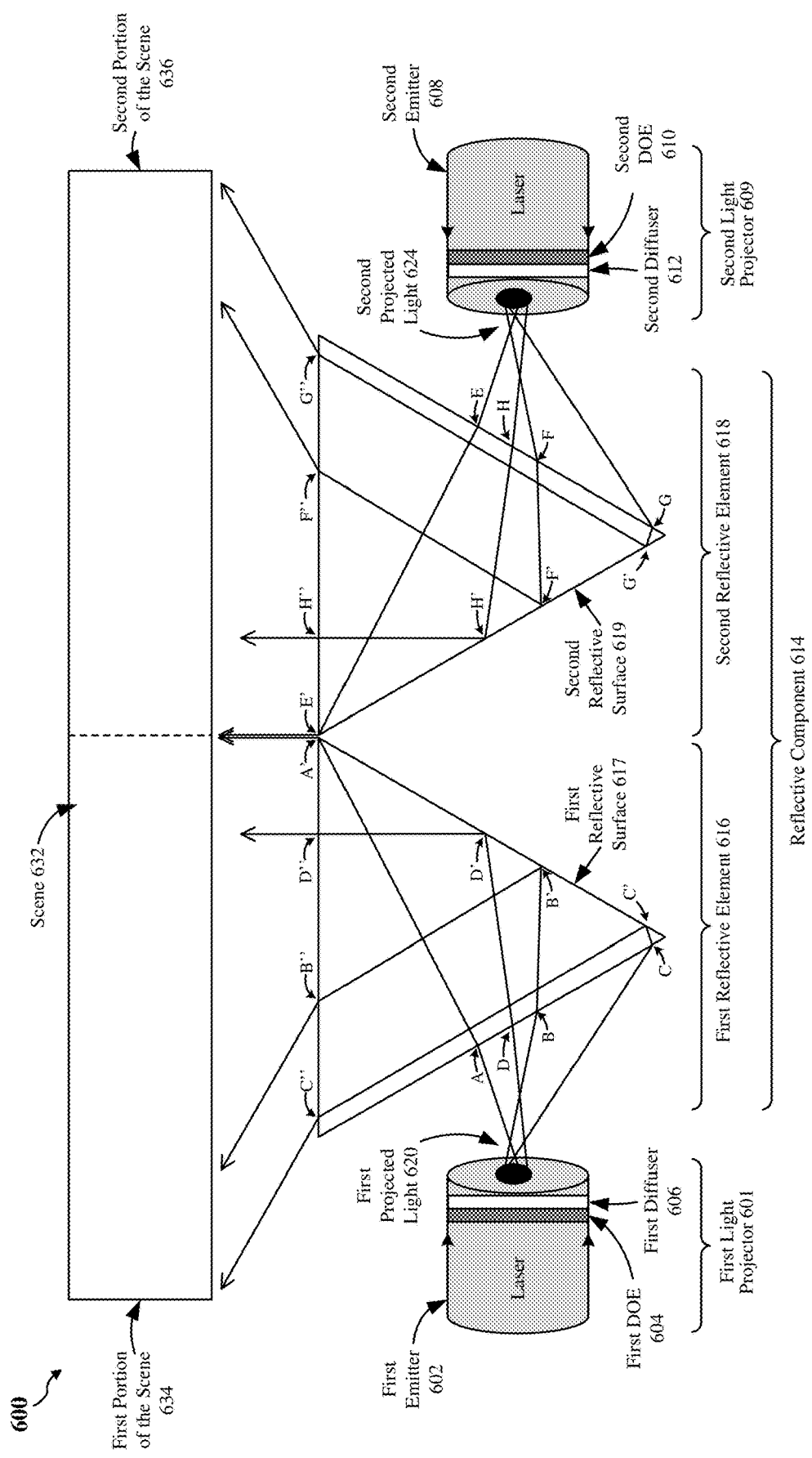
FIG. 6A shows an example ToF and SL system.

FIG. 6A shows an example ToF and SL light projection system 600. The system 600 includes a first emitter 602 and a second emitter 608, which may be example embodiments of the emitter 401 and the emitter 421 of FIG. 4, respectively. The system 600 further includes a reflective component 614 positioned between the first emitter 602 and the second emitter 608. The reflective component 614 redirects light projected by the first emitter 602 and the second emitter 608 onto a scene 632, which may include an object (not shown for simplicity). In some implementations, the system 600 may include one or more image capturing devices, such as a ToF camera and a SL camera (not shown for simplicity), for detecting reflections of the redirected light. In some aspects, the ToF camera and the SL camera may include an image sensor, such as the sensor 402 of FIG. 4. A first DOE 604 is coupled to the front of the first emitter 602, and a first diffuser 606 is coupled to the front of the first DOE 604. Similarly, a second DOE 610 is coupled to the front of the second emitter 608, and a second diffuser 612 is coupled to the front of the second DOE 610. The first DOE 604, the first diffuser 606, the second DOE 610, and the second diffuser 612 may be example embodiments of the DOE 405, the diffuser 407, the DOE 425, and the diffuser 427 of FIG. 4, respectively. A first lens (not shown for simplicity) may be situated between the first emitter 602 and the first DOE 604, and a second lens (not shown for simplicity) may be situated between the second emitter 608 and the second DOE 610. For purposes of discussion herein, the first emitter 602, the first lens, the first DOE 604, and the first diffuser 606 may collectively be referred to as a first light projector 601, and the second emitter 608, the second lens, the second DOE 610, and the second diffuser 612 may collectively be referred to as a second light projector 609. In some aspects, the first light projector 601 and the second light projector 609 may be identical (or nearly identical).

The first light projector 601 projects a first light towards the second light projector 609, and the second light projector 609 projects a second light towards the first light projector 601. In some implementations, the first projected light 620 is projected along an axis (not shown for simplicity) in a first direction, and the second projected light 624 is projected along the axis in a second direction opposite the first direction. In some aspects, the first and second light projectors may be physically separated by a distance, and the reflective component 614 may be positioned along the axis between the first and second light projectors.

The reflective component 614 may include a first reflective element 616 that optically folds a first optical path of the light projected from the first light projector 601 and a second reflective element 618 that optically folds a second optical path of the light projected from the second light projector 609. In some implementations, the first reflective element 616 may be a first prism including a first reflective surface 617 to receive the light projected from the first light projector 601, and the second reflective element 618 may be a second prism including a second reflective surface 619 to receive the light projected from the second light projector 609. In some other implementations, one or more portions of the reflective component 614 may be glass. The reflective component 614 redirects the first projected light 620 and the second projected light 624 onto a first portion of the scene 634 and a second portion of the scene 636, respectively. Specifically, the first reflective element 616 refracts the light folded by the first reflective element 616 onto the first portion of the scene 634 based at least in part on the first folded optical path, and the second reflective element 618 refracts the light folded by the second reflective element 618 onto the second portion of the scene 636 based at least in part on the second folded optical path.

In some implementations, the first reflective element 616 and the second reflective element 618 may have a same (or nearly same) refractive index. Thus, the reflective component 614 may symmetrically (or nearly symmetrically) refract the light projected by the first light projector 601 and the second light projector 609 onto respective portions of the first portion of the scene 634 and the second portion of the scene 636. In this manner, the first portion of the scene 634 and the second portion of the scene 636 may be adjacent to one another. In some implementations, the first portion and the second portion are non-overlapping relative to one another. That is, the first portion of the scene 634 and the second portion of the scene 636 may be aligned in such a manner that they seamlessly cover the scene 632 with a negligible amount (such as less than a first value) of gap and with a negligible amount (such as less than a second value) of overlap.

The example of FIG. 6A shows four example beams (A, B, C, and D) of light projected from the first light projector 601 and four example beams (E, F, G, and H) of light projected from the second light projector 609. For example, the first light projector 601 projects beam A, which enters the first reflective element 616 at point A. Based on the refractive properties of the first reflective element 616, beam A optically folds to point A' on the first reflective surface 617 and exits the first reflective element 616 at a first angle (e.g., 0°) towards the scene 632. Similarly, the second light projector 609 projects beam E, which enters the second reflective element 618 at point E. Based on the refractive properties of the second reflective element 618, beam E optically folds to point E' on the second reflective surface 619 and exits the second reflective element 618 at the first angle towards the scene 632. Since the first reflective element 616 and the second reflective element 618 have the same refractive index, points A and A' are symmetrical to points E and E', respectively.

As another example, the first light projector 601 projects beam B, which enters the first reflective element 616 at point B. Based on the refractive properties of the first reflective element 616, beam B optically folds to point B', then point B", and exits the first reflective element 616 at a second angle (e.g., greater than 70°) towards the scene 632. In a symmetrical fashion, the second light projector 609 projects beam F, which enters the second reflective element 618 at point F. Based on the refractive properties of the second reflective element 618, beam F optically folds to point F', then point F", and exits the second reflective element 618 at the second angle towards the scene 632.

Similarly, the first light projector 601 projects beam C, which enters the first reflective element 616 at point C. Based on the refractive properties of the first reflective element 616, beam C optically folds to point C', then point C", and exits the first reflective element 616 at a third angle (e.g., greater than 70°) towards the scene 632. In a symmetrical fashion, the second light projector 609 projects beam G, which enters the second reflective element 618 at point G. Based on the refractive properties of the second reflective element 618, beam G optically folds to point G', then point G", and exits the second reflective element 618 at the third angle towards the scene 632.

Similarly, the first light projector 601 projects beam D, which enters the first reflective element 616 at point D. Based on the refractive properties of the first reflective element 616, beam D optically folds to point D', then point D", and exits the first reflective element 616 at a third angle (e.g., 0°) towards the scene 632. In a symmetrical fashion, the second light projector 609 projects beam H, which enters the second reflective element 618 at point H. Based on the refractive properties of the second reflective element 618, beam H optically folds to point H', then point H", and exits the second reflective element 618 at the third angle towards the scene 632.

Thus, the reflective component 614 symmetrically refracts beams A-D and beams E-H, respectively, onto the scene 632. In this manner, beams are projected onto the first portion of the scene 634 and the second portion of the scene 636, and the system 600 has a wide (e.g., greater than 70 degrees) field of view (FOV) of the scene 632.

Figure 6B:
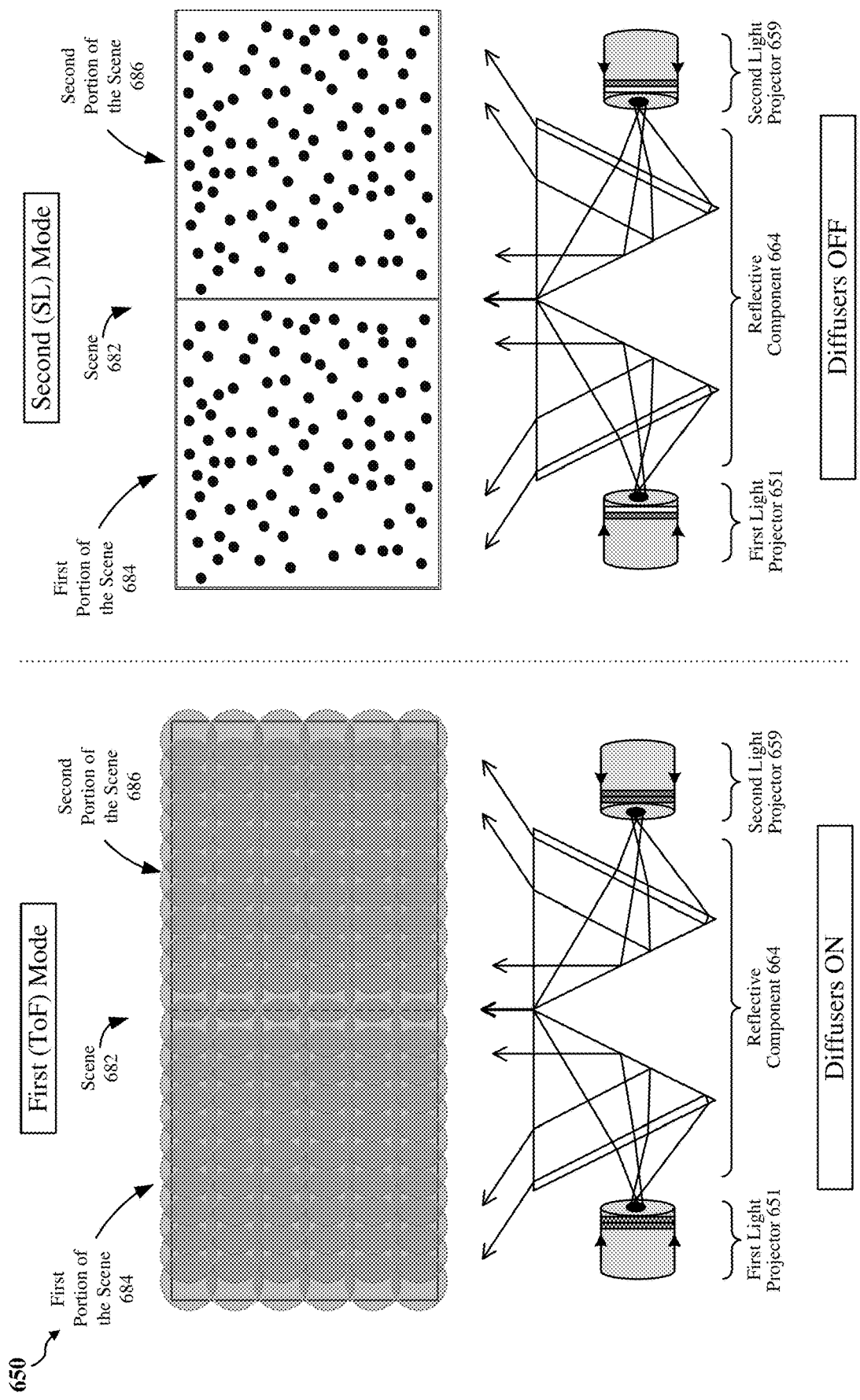
FIG. 6B shows the example ToF and SL system of FIG. 6A operating in a first and a second mode.

FIG. 6B shows an example ToF and SL light projection system 650 operating in a first mode (e.g., a ToF mode, as shown on the left) and a second mode (e.g., a SL mode, as shown on the right). The ToF and SL system 650 may be a simplified example embodiment of the ToF and SL system 600 of FIG. 6A. That is, the first light projector 651, the second light projector 659, and the reflective component 664 may be example embodiments of the first light projector 601, the second light projector 609, and the reflective component 614 of FIG. 6A, respectively. The reflective component 664 may redirect light projected by the first light projector 651 and the second light projector 659 onto a scene 682, which may include an object (not shown for simplicity). In some implementations, the system 650 may include one or more image capturing devices, such as a ToF camera and a SL camera (not shown for simplicity), for detecting reflections of the redirected light. In some aspects, the ToF camera and the SL camera may include an image sensor, which may be an example embodiment of the sensor 402 of FIG. 4. The system 650 may also include a controller (not shown for simplicity), such as the active depth controller 410 of FIG. 4.

In some implementations, each of the first diffuser and the second diffuser may be a switchable diffuser configured to transition the first light projector 651 and the second light projector 659, respectively, between a ToF sensing mode and a SL sensing mode. During the ToF mode, the first emitter and the second emitter may operate in a ToF projection mode, and the sensor 402 may operate in a ToF sensing mode, as described with respect to FIG. 5. During the SL mode, the first emitter and the second emitter may operate in a SL projection mode, and the sensor 402 may operate in a SL sensing mode, as also described with respect to FIG. 5.

During the ToF mode, the first diffuser and the second diffuser may be switched on, as indicated with solid gray. Thus, when the laser of the first light projector 651 emits light through the first DOE, the DOE distribution from the first DOE is diffused when passing through the first diffuser, which provides a flood illumination of a first portion of the scene 684. Similarly, when the laser of the second light projector 659 emits light through the second DOE, the DOE distribution from the second DOE is diffused when passing through the second diffuser, which provides a flood illumination of a second portion of the scene 686. Specifically, during the ToF mode, the first emitter transmits a first pulsed signal, and the first diffuser diffuses the first projected light to project a uniform flood distribution onto the first portion of the scene 684.

Similarly, during the ToF mode, the second emitter transmits a second pulsed signal, and the second diffuser diffuses the second projected light to project a uniform flood distribution onto the second portion of the scene 686. That is, the reflective component 664 may symmetrically (or nearly symmetrically) refract the light projected by each of the first light projector 651 and the second light projector 659 such that the portion of the scene upon which light is projected from the first light projector 651 (e.g., the first portion of the scene) can be adjacent to, yet non-overlapping with, the portion of the scene upon which light is projected from the second light projector 659 (e.g., the second portion of the scene). In this manner, the projections of light from the first and second light projectors 651 and 659, as refracted by the reflective component 664, may be aligned in such a manner that they seamlessly cover the scene 682 with a negligible amount (such as less than a first value) of gap and with a negligible amount (such as less than a second value) of overlap. Referring back to FIG. 4, a first reflected signal and a second reflected signal of the first pulsed signal and the second pulsed signal, respectively, may arrive at the sensor 402, and the sensor 402 captures frames including the pulsed signals. The active depth controller 410 (such as the signal processor 412) may calculate ToF depth information based on the captured frames by determining an amount of time for the light to be reflected back to the sensor 402.

During the SL mode, the first diffuser and the second diffuser may be switched off (as indicated with white). In some implementations, the first diffuser and the second diffuser function as transparent. Thus, when the laser of the first light projector 651 emits light through the first DOE during the SL mode, the DOE distribution from the first DOE passes through the first diffuser unaffected, which projects the first projected light onto the first portion of the scene 684 (e.g., as a first distribution of light points, such as a dot matrix pattern). Similarly, when the laser of the second light projector 659 emits light through the second DOE during the SL mode, the DOE distribution from the second DOE passes through the second diffuser unaffected, which projects the second projected light onto the second portion of the scene 686 (e.g., a second distribution of light points, such as a as a dot matrix pattern). In some implementations, the first distribution of light points and the second distribution of light points may be the same or similar.

Referring back to FIG. 4, the sensor 402 may capture frames including reflections of the redirected light (where the light is reflected by objects in the scene 632). The active depth controller 410 (such as the signal processor 412) may detect, in the captured frames, the redirected light projected by the first light projector 651 and the second light projector 659 as a first reflected light and a second reflected light, respectively. The active depth controller 410 (such as the signal processor 412) may then calculate SL depth information based on the manner in which the first projected light and the second projected light distorts on the first portion of the scene 684 and the second portion of the scene 686, respectively.

The active depth controller 410 may be configured to generate depth information based on the detected reflections of redirected light and correct for projection distortion in the generated depth information based at least in part on one or more angles of refraction associated with the reflective component 664. The controller 410 may use the generated SL depth information during calculation of the ToF depth information to reduce or eliminate multipath artifacts in the ToF depth information.

For instance, projecting light at an angle through a prism, rather than directly at the scene 632, may result in some level (or value) of distortion or skew in the resultant SL depth information. For purposes of discussion herein, the distortion or skew may be referred to as "projection distortion." In addition, it may take more time for the first projected light 620 and the second projected light 624 to be redirected through the reflective component 614 than if the first projected light 620 and the second projected light 624 were projected directly towards the scene 632. Thus, ToF depth information generated based on light redirected by the reflective component 614 may also include some level (or value) of projection distortion.

In some aspects of the present disclosure, the system 600 may be configured to negate or compensate for projection distortion. In some implementations, the reflective component 614 may distort the projected light in a known manner. Thus, at least one of the first light projector 601 or the second light projector 609 may include a predistortion pattern to negate the projection distortion. That is, the predistortion pattern may be incorporated into at least one of the first DOE 604 or the second DOE 610 such that the respective DOE pattern negates (or "cancels out") the known projection distortion. In addition or in the alternative, the system 600 may be configured to digitally compensate for projection distortion after detecting the reflections of the redirected light ("post-capture"), such as by using the active depth controller 410 of FIG. 4.

In some implementations, the system 650 may be included in or coupled to a device, such as a camera or a cellphone. Referring to FIG. 4, with device 400 as an example device, the active depth controller 410 may be configured to identify a face of a user of the device based at least in part on the generated depth information. In some aspects, the controller 410 may be further configured to resolve multipath interference (MPI) in a first portion of the generated depth information based at least in part on a second portion of the generated depth information.

Figure 7:
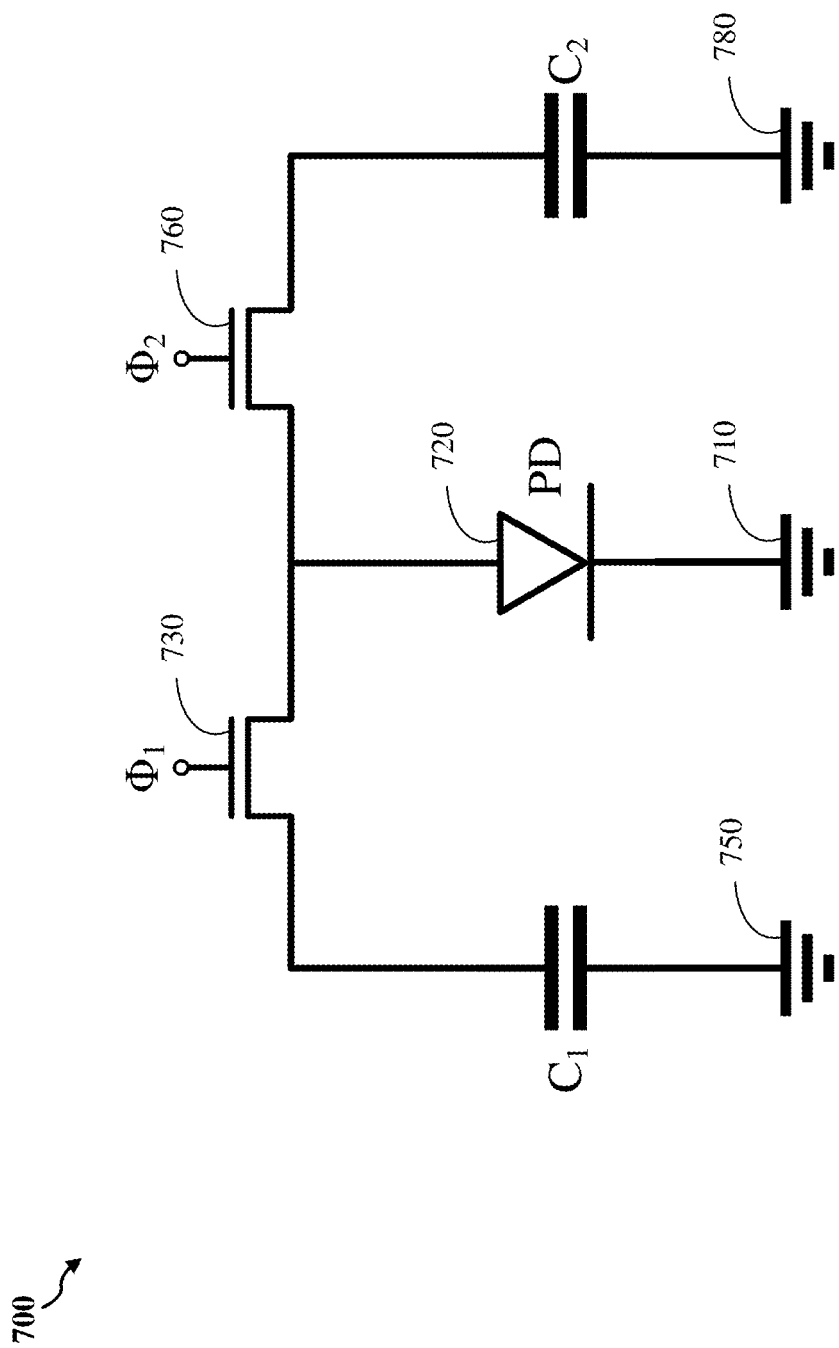
FIG. 7 shows an example electrical circuit diagram for a demodulation pixel cell.

FIG. 7 shows an example electrical circuit diagram for a demodulation pixel cell 700. In some implementations, the demodulation pixel cell 700 may be included in or coupled to a sensor, such as the sensor 402 of FIG. 4, and may be used for generating ToF depth information. The demodulation pixel cell 700 may include a photodiode 720 coupled to a ground potential 710. The photodiode 720 may convert light (e.g., photons) from reflected signals to electrical current, which flows to a transistor 730 and a transistor 760 coupled in parallel to the photodiode 720. The transistor 730 and the transistor 760 may block the current from flowing to a capacitor (C1) and a capacitor (C2), respectively. C1 may be coupled to a ground potential 750, and C2 may be coupled to a ground potential 780. In some aspects, at least one of the transistor 730 or the transistor 760 may be field-effect transistors (FETs). In some aspects, at least one of the transistor 730 and the transistor 760 may be metal-oxide-semiconductor field-effect transistors (MOSFETs).

For example, during a first exposure cycle, C1 may store a first charge (Q1) from a reflected signal when the shutter is opened at a first phase offset (e.g., $\Phi_1=0°$) relative to the transmitted signal, and C2 may store a second charge (Q2) from the reflected signal when the shutter is opened at a second phase offset (e.g., $\Phi_2=180°$) relative to the transmitted signal. During a second exposure cycle, C1 may store a third charge (Q3) from the reflected signal when the shutter is opened at a third phase offset (e.g., $\Phi_1=90°$ relative to the transmitted signal, and C2 may store a fourth charge (Q4) from the reflected signal when the shutter is opened at a fourth phase offset (e.g., $\Phi_2=270°$) relative to the transmitted signal. The phase offset, $\varphi$, between the transmitted signal and the reflected signal may be calculated based on the charges stored across C1 and C2 for each of the exposure cycles, which allows calculation of corresponding ToF depth information:

$$D = \frac{c*\Delta t}{2} = \frac{c*\theta}{2\omega} = \frac{c*\varphi}{4\pi * f_{mod}}$$

$$\sigma_{depth} \equiv \frac{1}{\sqrt{2}*SNR} * \frac{1}{2\pi} * \frac{c}{2*f_{mod}}$$

$$\varphi = \tan^{-1}\left(\frac{V_{90} - V_{270}}{V_0 - V_{180}}\right) = \frac{\pi}{2} * \left(1 - \frac{V_0 - V_{180}}{|V_0 - V_{180}| + |V_{90} - V_{270}|}\right),$$

where D represents depth information, c is the speed of light (i.e., $$3 * 10^8 \frac{m}{\sec}$$

$f_{mod}$ represents the modulation frequency of the transmitted signal, $V_0$-$V_{180}$ represents the integrated electrical signals for $\Phi_1$ and $\Phi_2$ during the first exposure cycle, $V_{90}$-$V_{270}$ represents the integrated electrical signals for $\Phi_1$ and $\Phi_2$ during the second exposure cycle, and $\sigma_{depth}$ represents a depth accuracy. Accordingly, the demodulation pixel cell 700 may capture ToF sensor data for generating ToF depth information.

Figure 8A:
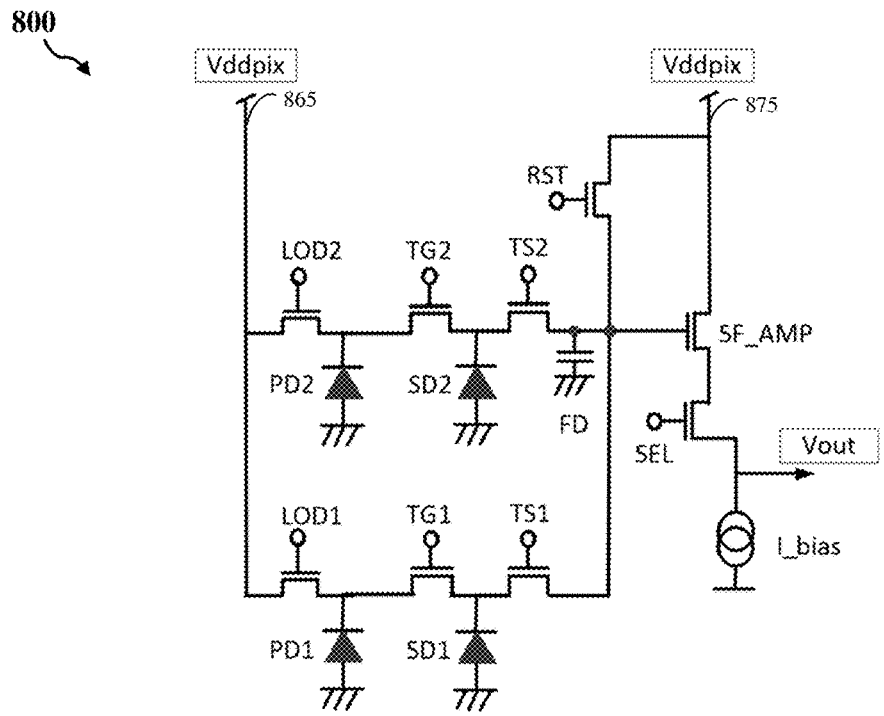
FIG. 8A shows an example electrical circuit diagram for a global shutter (GS) pixel array.

FIG. 8A shows an example electrical circuit diagram for a global shutter (GS) pixel array 800. The GS pixel array 800 may also be referred to herein as an NIR GS imager. The GS pixel array 800 includes two shared GS photodiodes, PD1 and PD2. Each of PD1 and PD2 may absorb photons (e.g., from light reflected back from a scene and/or an object) during a SL sensing mode. Each of PD1 and PD2 is coupled to a floating storage diode, SD1 and SD2, respectively. SD1 and SD2 may operate as storage node elements for charge accumulation and readout from the photodiodes PD1 and PD2. Each of the storage diodes SD1 and the SD2 is coupled to a transfer gate, TG1 and TG2, respectively. TG1 and TG2 may be transistors with relatively low voltage drops. Charge from PD1 and PD2 may flow to a transistor LOD1 and a transistor LOD2, respectively, which are each coupled to a supply voltage, Vddpix 865.

The GS pixel array 800 includes a capacitor FD for accumulating charge. The capacitor FD is coupled to a transistor TS1, which is coupled to, for example, the storage diode SD1. The capacitor FD is also coupled to a transistor TS2, which is coupled to, for example, the storage diode SD2. The capacitor FD is further coupled to a reset switch, RST. When RST is closed, charge may flow to Vddpix 875. When RST is open, charge may flow to a source follower amplifier, SF_AMP. Because the source voltage of SF_AMP remains proportional to the gate voltage, SF_AMP may convert charge to voltage and toggle a Select switch, SEL. When SEL is open (e.g., during a SL mode, when TS1 and TS2 are open), Vddpix 875 may be isolated, and a relatively small amount of charge from each of a series of signal pulses (e.g., a pulse train) may accumulate across the capacitor FD. When SEL is closed (e.g., after each of the SL modes, when TS1 and TS2 are closed), the series of accumulated signal pulses may be transferred from each of TG1 and TG2 to an output terminal, Vout. Vout may be coupled to a current source, I_bias. Accordingly, the GS pixel array 800 may capture SL sensor data for generating SL depth information.

Figure 8B:
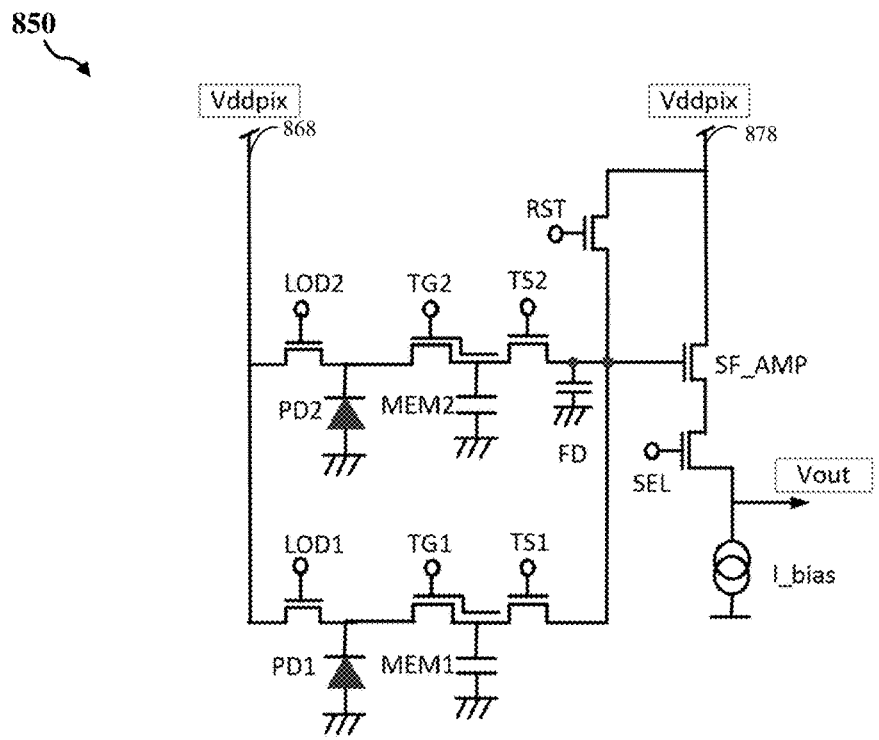
FIG. 8B shows another example electrical circuit diagram for a GS pixel array.

FIG. 8B shows an example electrical circuit diagram for a GS pixel array 850. The GS pixel array 850 may also be referred to herein as an NIR GS imager. The GS pixel array 850 includes two shared GS photodiodes, PD1 and PD2. Each of PD1 and PD2 may absorb photons (e.g., from light reflected back from a scene and/or an object) during a SL sensing mode. Each of PD1 and PD2 is coupled to a CCD-readout memory, MEM1 and MEM2, respectively. MEM1 and MEM2 may operate as storage node elements for charge accumulation and readout from the photodiodes PD1 and PD2. Each of MEM1 and MEM2 is coupled to a transfer gate, TG1 and TG2, respectively. TG1 and TG2 may be transistors with relatively low voltage drops. Charge from PD1 and PD2 may flow to a transistor LOD1 and a transistor LOD2, respectively, which are each coupled to a supply voltage, Vddpix 868.

The GS pixel array 850 includes a capacitor FD for accumulating charge. The capacitor FD is coupled to a transistor TS1, which is coupled to, for example, the CCD-readout memory, MEM1. The capacitor FD is also coupled to a transistor TS2, which is coupled to, for example, the CCD-readout memory, MEM2. The capacitor FD is further coupled to a reset switch, RST. When RST is closed, charge may flow to Vddpix 878. When RST is open, charge may flow to a source follower amplifier, SF_AMP. Because the source voltage of SF_AMP remains proportional to the gate voltage, SF_AMP may convert charge to voltage and toggle a Select switch, SEL. When SEL is open (e.g., during a SL mode, when TS1 and TS2 are open), Vddpix 878 may be isolated, and a relatively small amount of charge from each of a series of signal pulses (e.g., a pulse train) may accumulate across the capacitor FD. When SEL is closed (e.g., after each of the SL modes, when TS1 and TS2 are closed), the series of accumulated signal pulses may be transferred from each of TG1 and TG2 to an output terminal, Vout. Vout may be coupled to a current source, I_bias. Accordingly, the GS pixel array 850 may capture SL sensor data for generating SL depth information.

Figure 9:
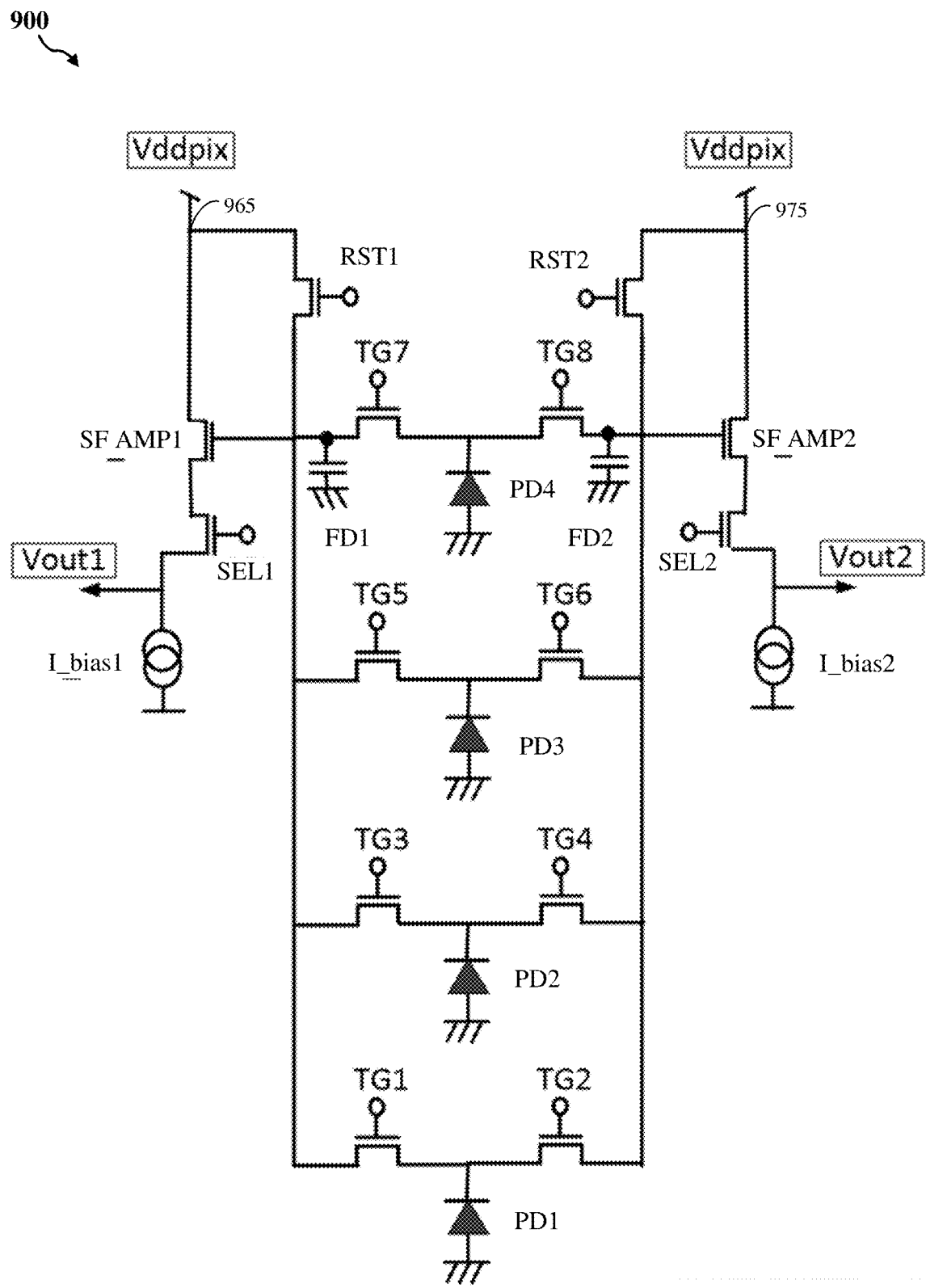
FIG. 9 shows an example electrical circuit diagram for a hybrid ToF and SL pixel array operating in a rolling shutter (RS) implementation.

FIG. 9 shows an example electrical circuit diagram for a rolling shutter (RS) pixel array 900. The pixel array 900 may also be referred to herein as a hybrid NIR RS imager and may be capable of operating in a ToF sensing mode and a SL sensing mode. The RS pixel array 900 may be an example embodiment of the sensor 402 of FIG. 4. The pixel array 900 may be configured to read-out signal line-by-line and thus, to operate in a constant wave mode (e.g., at a particular duty cycle) so as to expose each line of the RS for an equal amount of time. The RS pixel array 900 includes four shared RS photodiodes, PD1-PD4. Each of PD1-PD4 may absorb photons (e.g., from light reflected back from a scene and/or an object) during a SL sensing mode. PD1 is coupled to two transfer gates, TG1 and TG2. PD2 is coupled to two transfer gates, TG3 and TG4. PD3 is coupled to two transfer gates, TG5 and TG6. PD4 is coupled to two transfer gates, TG7 and TG8. Each of TG1-TG8 may be a transistor with a relatively low voltage drop.

The RS pixel array 900 includes capacitors FD1 and FD2 for accumulating charge from reflected signals. Each of FD1 and FD2 is coupled to a reset switch, RST1 and RS2, respectively. When either of RST1 and RS2 is closed, charge may flow to Vddpix 965 and Vddpix 975, respectively. When either of RST1 and RST2 is open, charge may flow to a source follower amplifier, SF_AMP1 and SF_AMP2, respectively. Because the source voltage of SF_AMP1 and SF_AMP2 remains proportional to the gate voltage, SF_AMP1 and SF_AMP2 may convert charge to voltage and toggle a corresponding Select switch, SEL1 and SEL2, respectively.

During the ToF sensing mode, each of TG1-TG8 may be closed (activated) and the pixel array 900 may demodulate multiple phases of reflected signals. SEL1 and SEL2 may be open during the ToF sensing mode, which may isolate Vddpix 965 and Vddpix 975, allowing a relatively small amount of charge from each of a series of signal pulses (e.g., a pulse train) to accumulate across FD1 and FD2. When SEL1 is closed, a series of accumulated signal pulses may be transferred from TG1, TG3, TG5, and TG7 to output terminal, Vout1. When SEL2 is closed, a series of accumulated signal pulses may be transferred from TG2, TG4, TG6, and TG8 to output terminal, Vout2. Vout1 may be coupled to a current source, I_bias1, and Vout2 may be coupled to a current source, I_bias2. Accordingly, the RS pixel array 900 may capture ToF sensor data for generating ToF depth information.

During the SL sensing mode, each of TG1, TG4, TG5, and TG8 (e.g., half of the read-out circuitry) may be closed, and each of TG2, TG3, TG6, and TG7 (e.g., the other half of the read-out circuitry) may be open. In this manner, reflected signals may be captured in dual-phase (e.g., one on the left, and one on the right) at different time frames. SEL1 and SEL2 may also be open during the SL sensing mode, which may isolate Vddpix 965 and Vddpix 975, allowing a relatively small amount of charge from each of a series of signal pulses (e.g., a pulse train) to accumulate across FD1 and FD2.

In this manner, the pixel array 900 may operate as a hybrid RS sensor for a mixed-mode ToF and SL system for generating high-resolution and high-accuracy depth information without MPI artifacts using the sparse depth information from the SL mode as a baseline to eliminate multipath effects from the ToF mode.

Figure 10:
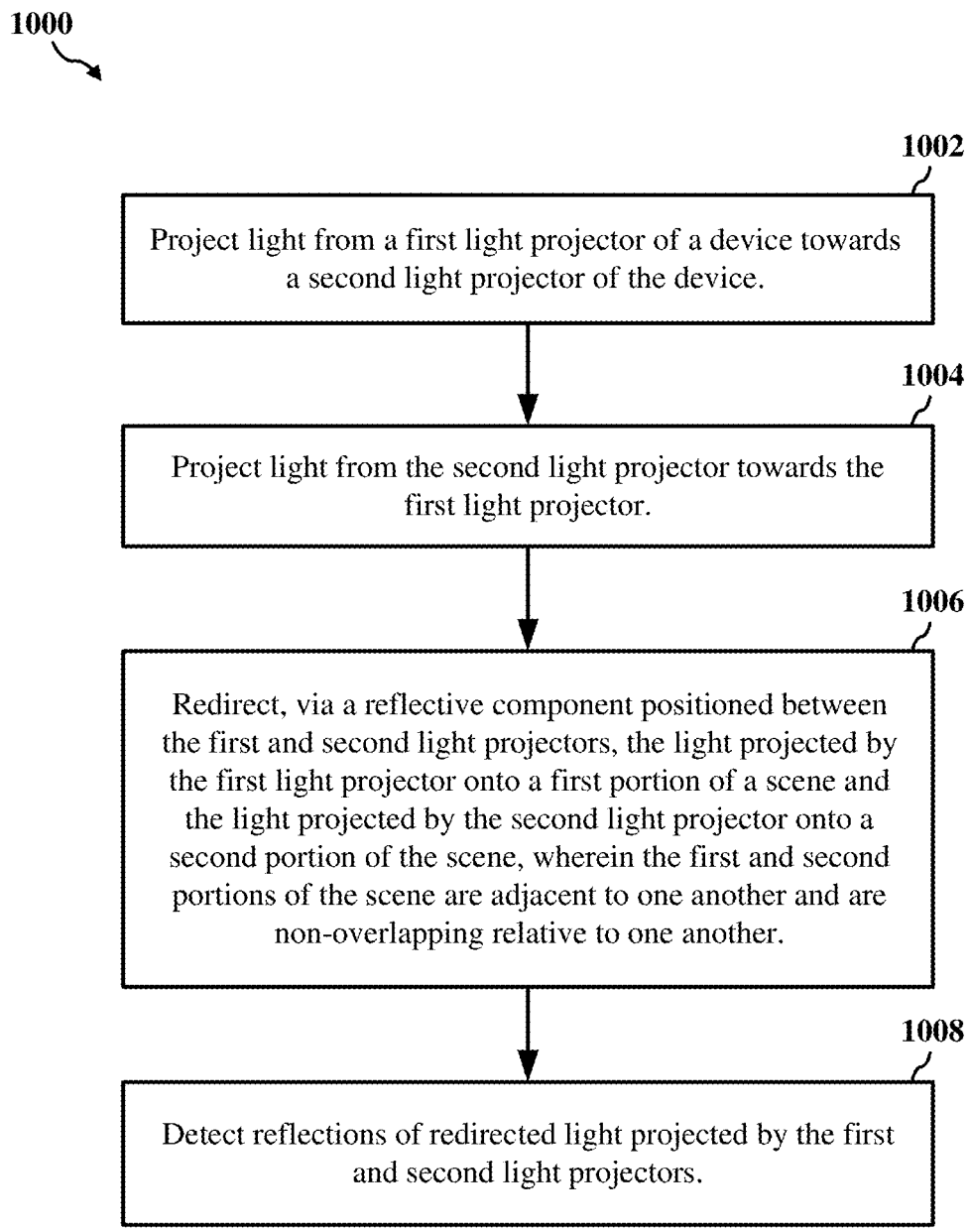
FIG. 10 shows a flowchart illustrating an example process for depth sensing according to some implementations.

FIG. 10 shows a flowchart illustrating an example process 1000 for depth sensing that may be performed by a device, according to some implementations. The process 1000 may be performed by a device such as the device 400 described above with reference to FIG. 4. At block 1002, the device projects light from a first light projector of the device towards a second light projector of the device. At block 1004, the device projects light from the second light projector towards the first light projector. At block 1006, the device redirects, via a reflective component positioned between the first and second light projectors, the light projected by the first light projector onto a first portion of a scene and the light projected by the second light projector onto a second portion of the scene, the first and second portions of the scene being adjacent to one another and non-overlapping relative to one another. At block 1008, the device detects reflections of redirected light projected by the first and second light projectors.

Figure 11A:
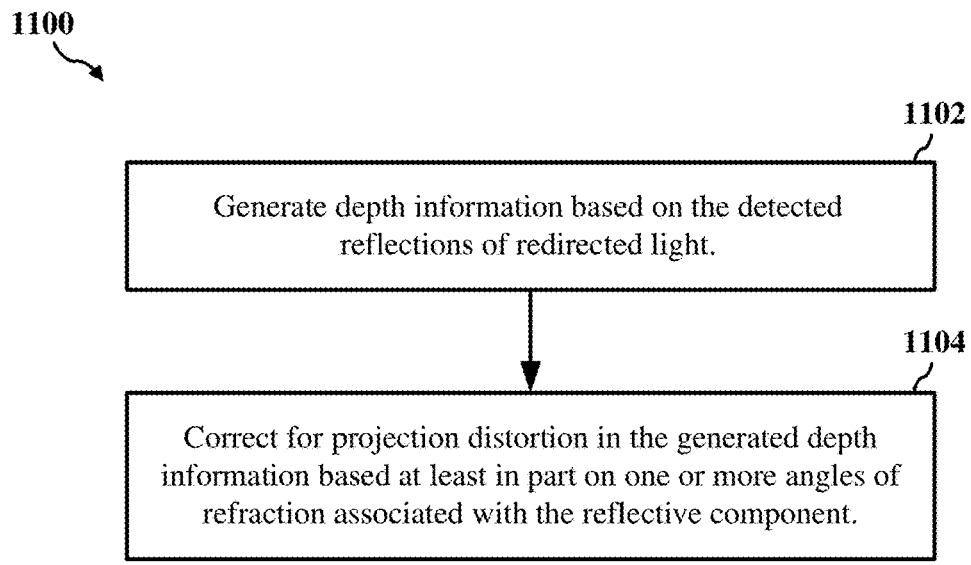
FIG. 11A shows a flowchart illustrating an example process for depth sensing according to some implementations.

FIG. 11A shows a flowchart illustrating an example process 1100 for depth sensing that may be performed by a device, according to some implementations. The process 1100 may be performed by a device such as the device 400 described above with reference to FIG. 4. In some implementations, the process 1100 begins after the process 1000 described with reference to FIG. 10. For example, at block 1102, after detecting the reflections of the redirected light projected by the first and second light projectors in block 1008 of the process 1000, the device generates depth information based on the detected reflections of redirected light, as described with respect to FIG. 6B. At block 1104, the device corrects for projection distortion in the generated depth information based at least in part on one or more angles of refraction associated with the reflective component, as also described with respect to FIG. 6B.

Figure 11B:
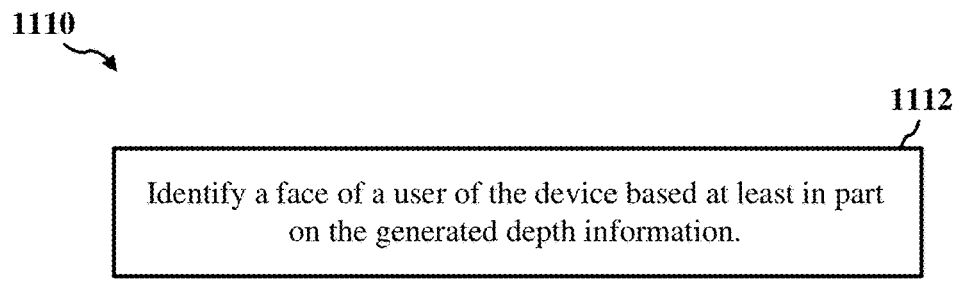
FIG. 11B shows a flowchart illustrating an example process for depth sensing according to some implementations.

FIG. 11B shows a flowchart illustrating an example process 1110 for depth sensing that may be performed by a device, according to some implementations. The process 1110 may be performed by a device such as the device 400 described above with reference to FIG. 4. In some implementations, the process 1110 begins after the process 1100 described with reference to FIG. 11A. For example, at block 1112, after correcting for the projection distortion in block 1104 of the process 1100, the device identifies a face of a user of the device based at least in part on the generated depth information, as described with respect to FIG. 6B.

Figure 11C:
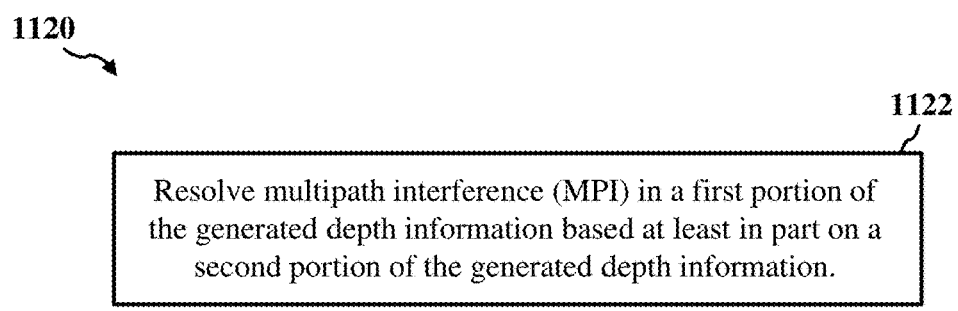
FIG. 11C shows a flowchart illustrating an example process for depth sensing according to some implementations.

FIG. 11C shows a flowchart illustrating an example process 1120 for depth sensing that may be performed by a device, according to some implementations. The process 1120 may be performed by a device such as the device 400 described above with reference to FIG. 4. In some implementations, the process 1120 begins after generating the depth information in block 1102 of the process 1100. At block 1122, the device resolves multipath interference (MPI) in a first portion of the generated depth information based at least in part on a second portion of the generated depth information, as described with respect to FIG. 5 and FIG. 6B.

Figure 12:
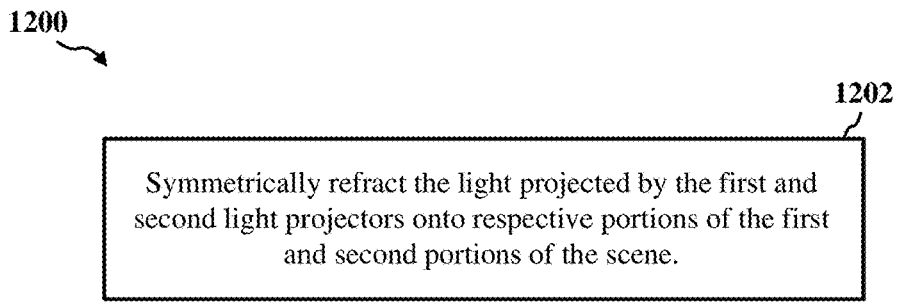
FIG. 12 shows a flowchart illustrating an example process for depth sensing according to some implementations.

FIG. 12 shows a flowchart illustrating an example process 1200 for depth sensing that may be performed by a device, according to some implementations. The process 1200 may be performed by a device such as the device 400 described above with reference to FIG. 4. In various aspects, the example process 1200 of FIG. 12 may be one implementation for redirecting the light in block 1006 of the process 1000 of FIG. 10. At block 1202, the device symmetrically refracts the light projected by the first and second light projectors onto respective portions of the first and second portions of the scene, as described with respect to FIG. 6A.

Figure 13A:
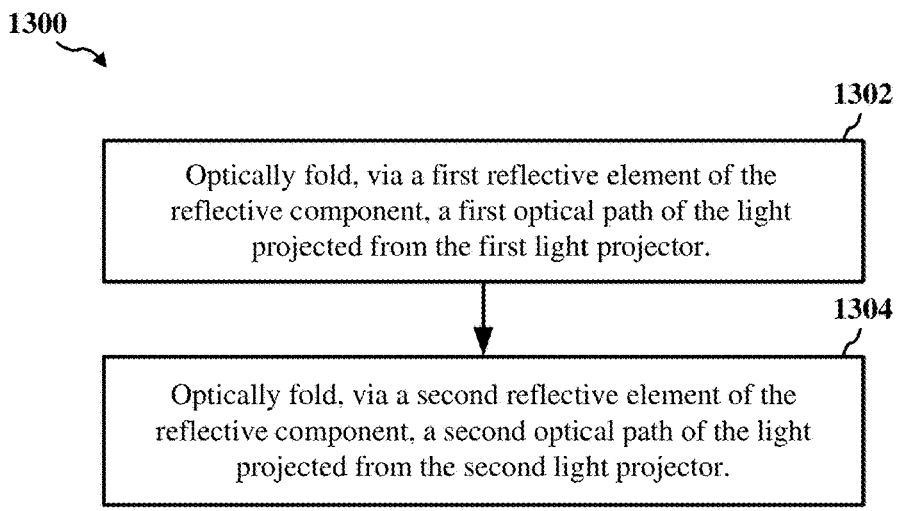
FIG. 13A shows a flowchart illustrating an example process for depth sensing according to some implementations.

FIG. 13A shows a flowchart illustrating an example process 1300 for depth sensing that may be performed by a device, according to some implementations. The process 1300 may be performed by a device such as the device 400 described above with reference to FIG. 4. In various aspects, the example process 1300 of FIG. 13 may be one implementation for redirecting the light in block 1006 of the process 1000 of FIG. 10. At block 1302, the device optically folds, via a first reflective element of the reflective component, a first optical path of the light projected from the first light projector, as described with respect to FIG. 6A. At block 1304, the device optically folds, via a second reflective element of the reflective component, a second optical path of the light projected from the second light projector, as also described with respect to FIG. 6A.

Figure 13B:
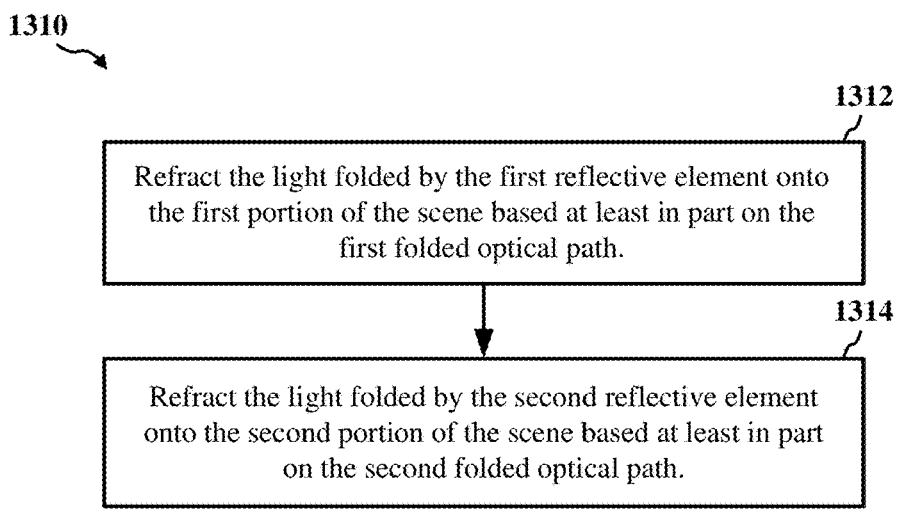
FIG. 13B shows a flowchart illustrating an example process for depth sensing according to some implementations.

FIG. 13B shows a flowchart illustrating an example process 1310 for depth sensing that may be performed by a device, according to some implementations. The process 1310 may be performed by a device such as the device 400 described above with reference to FIG. 4. In some implementations, the process 1310 begins after optically folding the first and second optical paths in blocks 1302 and 1304 of the process 1300 described with reference to FIG. 13A. At block 1312, the device refracts the light folded by the first reflective element onto the first portion of the scene based at least in part on the first folded optical path, as described with respect to FIG. 6A. At block 1314, the device refracts the light folded by the second reflective element onto the second portion of the scene based at least in part on the second folded optical path, as also described with respect to FIG. 6A.

Figure 13C:
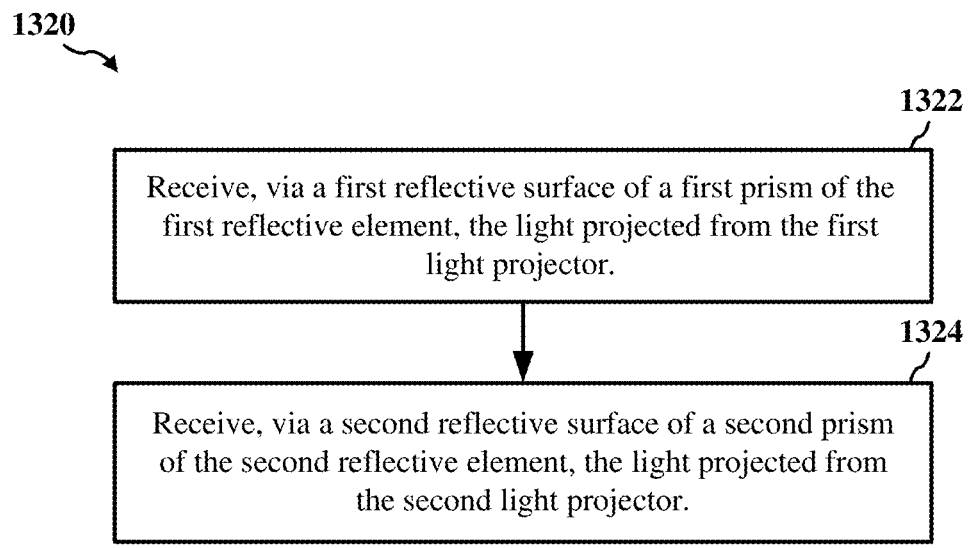
FIG. 13C shows a flowchart illustrating an example process for depth sensing according to some implementations.

FIG. 13C shows a flowchart illustrating an example process 1320 for depth sensing that may be performed by a device, according to some implementations. The process 1320 may be performed by a device such as the device 400 described above with reference to FIG. 4. In some implementations, the process 1320 begins before optically folding the first and second optical paths in blocks 1302 and 1304 of the process 1300 described with reference to FIG. 13A. At block 1322, the device receives, via a first reflective surface of a first prism of the first reflective element, the light projected from the first light projector, as described with respect to FIG. 6A. At block 1324, the device receives, via a second reflective surface of a second prism of the second reflective element, the light projected from the second light projector, as also described with respect to FIG. 6A.

Figure 14:
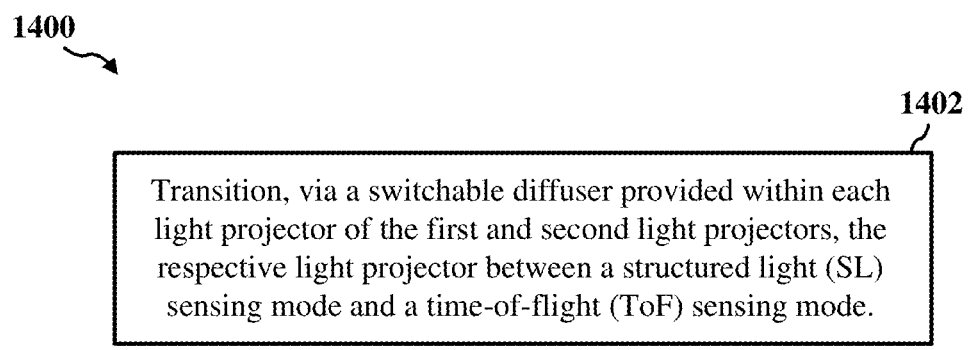
FIG. 14 shows a flowchart illustrating an example process for depth sensing according to some implementations.

FIG. 14 shows a flowchart illustrating an example process 1400 for depth sensing that may be performed by a device, according to some implementations. The process 1400 may be performed by a device such as the device 400 described above with reference to FIG. 4. In various aspects, the example process 1400 of FIG. 14 may be one implementation for projecting the light from one or more of the first and second light projectors in one or more of blocks 1002 and 1004 of the process 1000 of FIG. 10. At block 1402, the device transitions, via a switchable diffuser provided within each light projector of the first and second light projectors, the respective light projector between a structured light (SL) sensing mode and a time-of-flight (ToF) sensing mode, as also described with respect to FIG. 6B.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 406 in the device 400 of FIG. 4) including instructions 408 that, when executed by the processor 404 (or the active depth controller 410), cause the device 400 to perform one or more of the methods described above. The non-transitory processor-readable data storage medium may form part of a computer program product, which may include packaging materials.

The non-transitory processor-readable storage medium may include random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 404 or the active depth controller 410 in the device 400 of FIG. 4. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. For example, while the projectors are illustrated as including a lens to direct light toward a diffractive element, a projector may not include a lens or may include multiple lenses. In another example, the electricity applied by the device or light projector in adjusting the projection may be alternating current (AC) or direct current (DC), and the voltage may be constant or non-constant. The electricity therefore may be any suitable electricity for adjusting the projection. Additionally, the functions, steps or actions of the method claims in accordance with aspects described herein need not be performed in any particular order unless expressly stated otherwise. For example, the steps of the described example operations, if performed by the device 400, the active depth controller 410, the processor 404, and/or the memory 406, may be performed in any order and at any frequency. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A device, comprising:
a first light projector and a second light projector, the first light projector configured to project light towards the second light projector, the second light projector configured to project light towards the first light projector;
a reflective component positioned between the first and second light projectors, the reflective component configured to redirect the light projected by the first light projector onto a first portion of a scene and to redirect the light projected by the second light projector onto a second portion of the scene, wherein the first and second portions of the scene are adjacent to one another and are non-overlapping relative to one another; and
a light sensor configured to detect reflections of redirected light projected by the first and second light projectors.

2. The device of claim 1, further comprising a processor configured to:
generate depth information based on the detected reflections of redirected light; and
correct for projection distortion in the generated depth information based at least in part on one or more angles of refraction associated with the reflective component.

3. The device of claim 2, wherein the device is at least one of a camera or a cellphone, and wherein the processor is further configured to:
identify a face of a user of the device based at least in part on the generated depth information.

4. The device of claim 2, wherein the processor is further configured to resolve multipath interference (MPI) in a first portion of the generated depth information based at least in part on a second portion of the generated depth information.

5. The device of claim 1, wherein the reflective component is further configured to symmetrically refract the light projected by the first and second light projectors onto respective portions of the first and second portions of the scene.

6. The device of claim 1, wherein the reflective component includes:
a first reflective element configured to optically fold a first optical path of the light projected from the first light projector; and
a second reflective element configured to optically fold a second optical path of the light projected from the second light projector.

7. The device of claim 6, wherein the first and second reflective elements have a same refractive index.

8. The device of claim 6, wherein:
the first reflective element is further configured to refract the light folded by the first reflective element onto the first portion of the scene based at least in part on the first folded optical path; and
the second reflective element is further configured to refract the light folded by the second reflective element onto the second portion of the scene based at least in part on the second folded optical path.

9. The device of claim 6, wherein:
the first reflective element comprises a first prism including a first reflective surface to receive the light projected from the first light projector; and
the second reflective element comprises a second prism including a second reflective surface to receive the light projected from the second light projector.

10. The device of claim 1, wherein each light projector of the first and second light projectors further comprises a switchable diffuser configured to transition the respective light projector between a structured light (SL) sensing mode and a time-of-flight (ToF) sensing mode.

11. The device of claim 1, wherein each portion of the first and second portions of the scene has a field of view (FOV) greater than 70 degrees.

12. The device of claim 1, wherein:
the light projected by the first light projector is projected along an axis in a first direction;
the light projected by the second light projector is projected along the axis in a second direction opposite the first direction;
the first and second light projectors are physically separated by a distance; and
the reflective component is positioned along the axis between the first and second light projectors.

13. A method, comprising:
projecting light from a first light projector of a device towards a second light projector of the device;
projecting light from the second light projector towards the first light projector;
redirecting, via a reflective component positioned between the first and second light projectors, the light projected by the first light projector onto a first portion of a scene and the light projected by the second light projector onto a second portion of the scene, wherein the first and second portions of the scene are adjacent to one another and are non-overlapping relative to one another; and
detecting reflections of redirected light projected by the first and second light projectors.

14. The method of claim 13, further comprising:
generating depth information based on the detected reflections of redirected light; and
correcting for projection distortion in the generated depth information based at least in part on one or more angles of refraction associated with the reflective component.

15. The method of claim 14, further comprising identifying a face of a user of the device based at least in part on the generated depth information.

16. The method of claim 14, further comprising resolving multipath interference (MPI) in a first portion of the generated depth information based at least in part on a second portion of the generated depth information.

17. The method of claim 13, further comprising symmetrically refracting the light projected by the first and second light projectors onto respective portions of the first and second portions of the scene.

18. The method of claim 13, further comprising:
optically folding, via a first reflective element of the reflective component, a first optical path of the light projected from the first light projector; and
optically folding, via a second reflective element of the reflective component, a second optical path of the light projected from the second light projector.

19. The method of claim 18, wherein the first and second reflective elements have a same refractive index.

20. The method of claim 18, further comprising:
refracting the light folded by the first reflective element onto the first portion of the scene based at least in part on the first folded optical path; and
refracting the light folded by the second reflective element onto the second portion of the scene based at least in part on the second folded optical path.

21. The method of claim 18, further comprising:
receiving, via a first reflective surface of a first prism of the first reflective element, the light projected from the first light projector; and
receiving, via a second reflective surface of a second prism of the second reflective element, the light projected from the second light projector.

22. The method of claim 13, further comprising transitioning, via a switchable diffuser provided within each light projector of the first and second light projectors, the respective light projector between a structured light (SL) sensing mode and a time-of-flight (ToF) sensing mode.

23. The method of claim 13, wherein each portion of the first and second portions of the scene has a field of view (FOV) greater than 70 degrees.

24. The method of claim 13, wherein:
the light projected by the first light projector is projected along an axis in a first direction;
the light projected by the second light projector is projected along the axis in a second direction opposite the first direction;
the first and second light projectors are physically separated by a distance; and
the reflective component is positioned along the axis between the first and second light projectors.

25. A non-transitory computer-readable medium storing instructions that, when executed by one or more processors of a device, causes the apparatus to perform operations comprising:
projecting light from a first light projector of the device towards a second light projector of the device;
projecting light from the second light projector towards the first light projector;
redirecting, via a reflective component positioned between the first and second light projectors, the light projected by the first light projector onto a first portion of a scene and the light projected by the second light projector onto a second portion of the scene, wherein the first and second portions of the scene are adjacent to one another and are non-overlapping relative to one another; and
detecting reflections of redirected light projected by the first and second light projectors.

26. The non-transitory computer-readable medium of claim 25, wherein execution of the instructions causes the device to perform operations further comprising:
generating depth information based on the detected reflections of redirected light; and
correcting for projection distortion in the generated depth information based at least in part on one or more angles of refraction associated with the reflective component.

27. The non-transitory computer-readable medium of claim 25, wherein execution of the instructions causes the device to perform operations further comprising:
symmetrically refracting the light projected by the first and second light projectors onto respective portions of the first and second portions of the scene.

28. The non-transitory computer-readable medium of claim 25, wherein execution of the instructions causes the device to perform operations further comprising:
optically folding, via a first reflective element of the reflective component, a first optical path of the light projected from the first light projector; and
optically folding, via a second reflective element of the reflective component, a second optical path of the light projected from the second light projector.

29. The non-transitory computer-readable medium of claim 28, wherein execution of the instructions causes the device to perform operations further comprising:
refracting the light folded by the first reflective element onto the first portion of the scene based at least in part on the first folded optical path;
receiving, via a first reflective surface of a first prism of the first reflective element, the light projected from the first light projector;
refracting the light folded by the second reflective element onto the second portion of the scene based at least in part on the second folded optical path; and
receiving, via a second reflective surface of a second prism of the second reflective element, the light projected from the second light projector.

30. The non-transitory computer-readable medium of claim 25, wherein execution of the instructions causes the device to perform operations further comprising: transitioning, via a switchable diffuser provided within each light projector of the first and second light projectors, the respective light projector between a structured light (SL) sensing mode and a time-of-flight (ToF) sensing mode.

* * * * *